United States Patent [19]

Cherry et al.

[11] Patent Number: 5,446,271

[45] Date of Patent: Aug. 29, 1995

[54] OMNIDIRECTIONAL SCANNING METHOD AND APPARATUS

[75] Inventors: Craig D. Cherry; Robert J. Actis, both of Eugene, Oreg.

[73] Assignee: Spectra-Physics Scanning Systems, Inc., Eugene, Oreg.

[21] Appl. No.: 103,403

[22] Filed: Aug. 6, 1993

[51] Int. Cl.⁶ .............................................. G06K 7/10
[52] U.S. Cl. .................................................. 235/462
[58] Field of Search ............................... 235/462, 472

[56] References Cited

U.S. PATENT DOCUMENTS

| | | |
|---|---|---|
| 3,801,775 | 4/1974 | Acker . |
| 4,000,397 | 12/1976 | Hebert et al. . |
| 4,246,612 | 1/1981 | Berry et al . |
| 4,691,367 | 9/1987 | Wevelsiep . |
| 4,879,456 | 11/1989 | Cherry et al. ........................ 235/462 |
| 4,963,719 | 10/1990 | Brooks et al. . |
| 5,120,940 | 6/1992 | Willsie ................................ 235/462 |
| 5,124,537 | 6/1992 | Chandler et al. ................... 235/462 |
| 5,126,544 | 6/1992 | Izumi . |
| 5,144,118 | 9/1992 | Actis et al. . |
| 5,155,343 | 10/1992 | Chandler et al. ................... 235/462 |
| 5,155,344 | 10/1992 | Fardeau et al. ..................... 235/462 |
| 5,291,005 | 3/1994 | Ishii et al. ........................... 235/449 |
| 5,296,690 | 3/1994 | Chandler et al. ................... 235/462 |
| 5,304,787 | 4/1994 | Wang .................................. 235/462 |
| 5,311,001 | 5/1994 | Joseph et al. ....................... 235/462 |
| 5,319,181 | 6/1994 | Shellhammer et al. ............. 235/462 |
| 5,329,105 | 7/1994 | Klancnik et al. ................... 235/462 |
| 5,343,028 | 8/1994 | Figarella et al .................... 235/462 |
| 5,378,881 | 1/1995 | Adachi ............................... 235/462 |

FOREIGN PATENT DOCUMENTS 1-74687  3/1989  Japan .

OTHER PUBLICATIONS

Ronald E. Crochiere and Lawrence R. Rabiner, Multirate Digital Signal Processing (Prentice-Hall, 1983), pp. 20–29.

*Primary Examiner*—F. L. Evans
*Attorney, Agent, or Firm*—Lyon & Lyon

[57] ABSTRACT

A method and apparatus for reading encoded symbols such as bar code labels at any orientation to a raster scanning device. A pattern of virtual scan lines is selected over the two-dimensional imaging region according to the specifications of the images to be read. The pattern is generated by defining a family of parallel lines of a certain spacing and rotating the family by a specified angle until the two-dimensional imaging region is covered. Only the data at selected raster locations on the virtual scan lines is stored and processed. One-dimensional signal processing methods are used to detect edges and decode the encoded symbols.

72 Claims, 30 Drawing Sheets

(NOT TO SCALE)

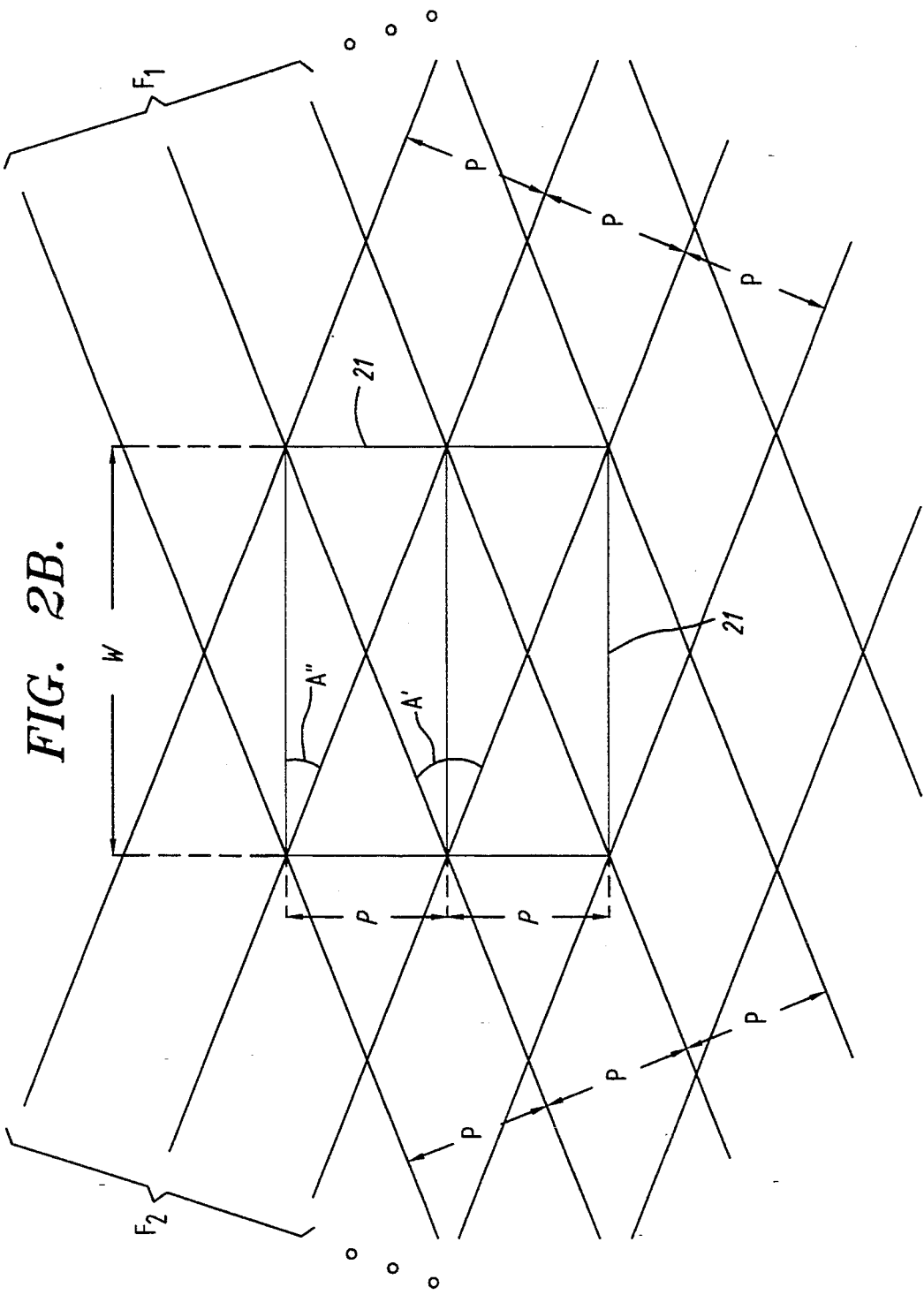

FIG. 12A.
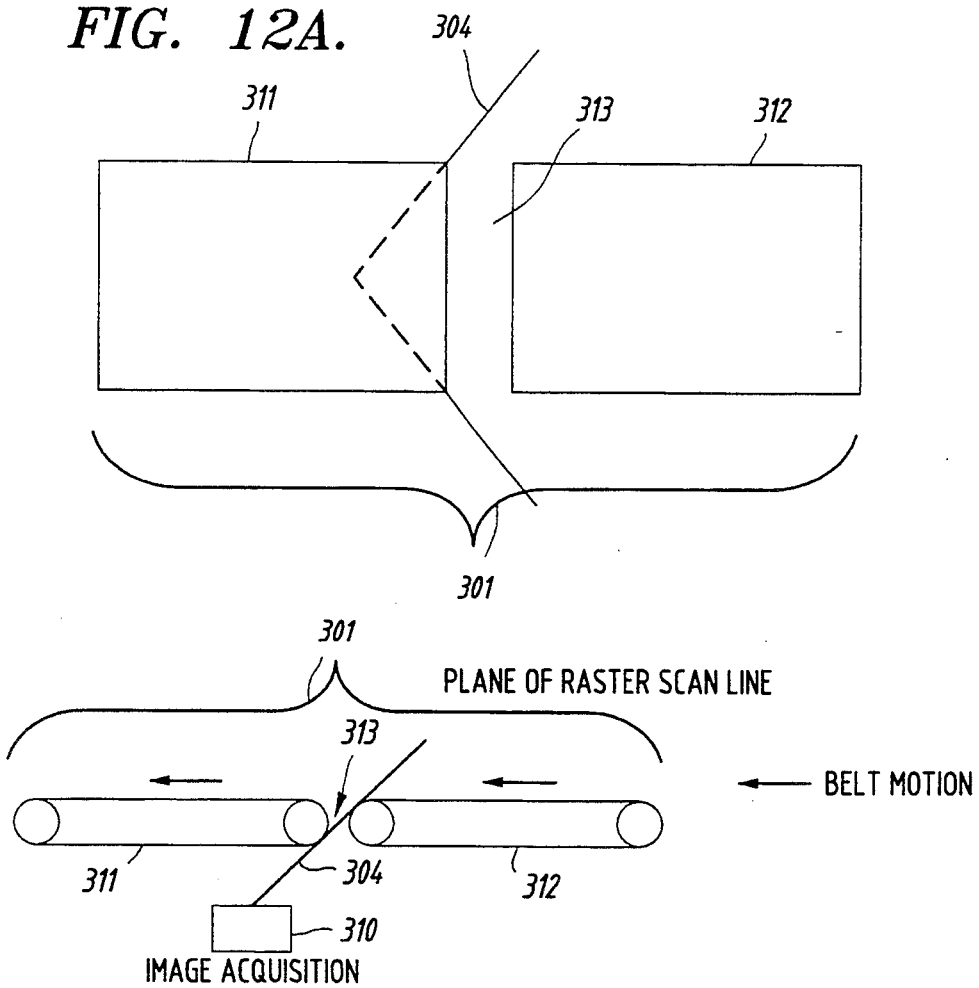
FIG. 12B.
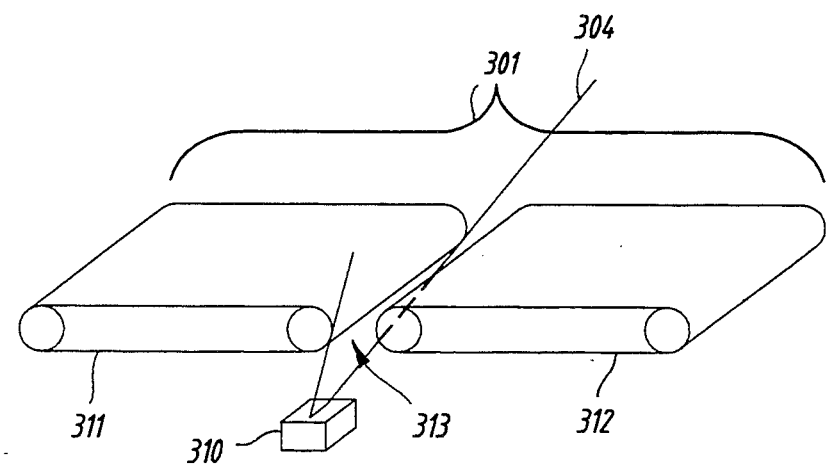
FIG. 12C.

OMNIDIRECTIONAL SCANNING METHOD AND APPARATUS

Microfiche Appendix

A "Microfiche Appendix" is filed herewith and comprises one microfiche of 60 frames.

FIELD OF THE INVENTION

The field of the present invention relates to optical reading devices and, more particularly, to a method and apparatus for omnidirectional reading of bar code symbols by efficient selection of data from a raster scanned optical sensor.

BACKGROUND OF THE INVENTION

Various methods have been developed for optically reading data or encoded symbols such as bar code labels. Bar codes are used commercially in many applications, including the identification of retail products at the point of sale, control of inventories, and package identification.

Bar codes typically consist of a series of parallel light and dark rectangular areas of varying widths. The light areas are often referred to as "spaces" and the dark areas as "bars". In many bar code symbologies, the bars and spaces are comprised of one or more smaller components called "modules". Light or dark modules are located adjacently to form larger spaces and bars of varying widths. Different widths of bars and spaces define different characters in a particular bar code symbology. A module is the narrowest element for a given symbology; thus, a bar or space comprised of a single module would have the narrowest possible width.

A bar code label may be read by a scanner which detects reflected and/or refracted light from the bars and spaces comprising the characters. One common method of illuminating the bar code label is by use of a scanning laser beam, in which case a beam of light sweeps across the bar code label and an optical detector detects the reflected light. The detector generates an electrical signal having an amplitude determined by the intensity of the collected light. Another method for illuminating the bar code label is by use of a uniform light source with the reflected light detected by an array (commonly called a charge-coupled device or CCD) of optical detectors connected to an analog shift register. In such a technique, as with a scanning laser, an electrical signal is generated having an amplitude determined by the intensity of the collected light. In either the scanning laser or CCD technique, the amplitude of the electrical signal has one level for dark bars and a second level for light spaces. As the label is scanned, positive-going and negative-going transitions in the electrical signal occur, signifying transitions between bars and spaces. Techniques are known for detecting edges of bars and spaces by detecting the transitions of the electrical signal. Techniques are also known for determining the widths of bars and spaces based on the relative location of the detected edges and decoding the information represented by the bar code.

In order to scan a bar code, the bar coded items may be moved manually in front of the scanner or automatically on a moving conveyer belt. Alternatively, the scanner may be held by an operator and directed at a bar code. Some bar code labels may be "truncated" (that is, have short bars relative to the length of the label). Existing scanning devices require careful operation to attain a high probability of a successful read and are difficult to use with truncated labels because of the difficulty of attaining proper orientation of the bar code label with respect to the scanner. Randomly oriented items on a conveyer belt must have very long bars relative to the length of the code in order to have a high probability of being read.

Handheld single line scanners, either laser or CCD, require that an operator aim and orient the scanner relative to the bar code so that the scan line is substantially perpendicular to the bar code edges. Such operation requires some care on the part of the operator and reduces productivity. Furthermore, these devices are sensitive to label defects, as detection of bar and space edges is typically done along a single narrow scan line. To maximize the productivity of the operator and minimize stresses due to repetitive motions of the operator's body, and to minimize sensitivity to label defects, it is therefore desirable to read bar codes which may be at any orientation relative to the scanning device.

Existing point of sale scanning systems typically require an operator to handle each item (or handle a portable scanner) in order to orient the item to the scanner for scanning. A conveyer belt system may be used to reduce the amount of effort required. Current conveyer systems, however, have difficulty scanning items which are labeled on the bottom surface. Consequently, the operator either must position the item so the bar code is not on the bottom, or must take each item from a feed conveyer, scan it, and place it on a takeaway conveyer. Existing systems generally do not allow scanning of all surfaces of the packages, requiring the operator to position the packages so the bar code is on the surfaces which are scanned.

Various methods have been used to attempt to read a bar code label at any orientation to the scanner in a minimum of passes. Thus, multi-line or complex-pattern laser scanners exist which can read bar codes over a range of orientations. In general, these devices utilize pattern-forming mirrors or holographic beam deflection elements, and are hence larger than other scanners and require more components as the scan pattern complexity increases. These scanners typically require a complex mechanism to sweep the laser beam in a predetermined pattern and therefore require additional and costly mechanical parts, increasing proneness to wear.

In another type of scanner, a two-dimensional array of CCD elements is used to obtain an entire image of the bar code at one time. However, the drawback of these devices is that large amounts of memory are needed to store the image to be processed, and large amounts of computation are needed to extract the edge location data from the stored image. Further, complicated algorithms are necessary to determine the orientation and characteristics of the bar code label.

Existing area imaging scanners are limited in working range (depth of field), and may require that the operator orient the bar code with the bar edges nearly perpendicular to the raster lines. Some systems increase the working range by using additional hardware to automatically focus the imaging system on the bar coded item, increasing the cost and complexity of the system. Also, existing area imaging scanners generally have a small field of view, requiring the operator to position the bar code to be read within a relatively small area. The small field of view also limits the range of bar code label sizes which may be read for a given combination of imaging sensor and lens.

In certain applications it may be desirable to minimize the physical size of the scanning device. For example, the size and weight of handheld scanners may be minimized to avoid operator fatigue. In fixed applications such as point of sale checkstands, it is advantageous to minimize the amount of space needed inside of or on the checkstand to mount and operate the scanner. Scanner designs which require mounting within the checkstand increase the expense and inconvenience of installation. Scanners which have excessive hardware components cause operator fatigue in handheld scanners and take up unnecessary room in fixed mountings.

Most existing scanner designs use moving parts to opto-mechanically scan the bar code. The actuator, bearings, and associated drive circuits are typically among the least reliable components in the scanner, and use a significant proportion of the power consumed by the system. It is desirable to increase system reliability and decrease power consumption in order to allow long periods of operation on batteries, or the use of simple, low power, line operated power supplies.

SUMMARY OF THE INVENTION

The present invention provides a means for reading encoded symbols such as bar code labels by making efficient use of area scanned input. The input data may be provided by an area sensor such as a two dimensional CCD array or a video tube, or a single line sensor (such as a single line CCD or a single line laser scanner) combined with either movement of the item or an additional transverse scanning mechanism providing the second axis of the raster scan. Not all of the scanning data, but only a select portion of the data corresponding to virtual scan lines is stored and processed. A pattern of virtual scan lines is defined based on the dimensions of bar code labels to be scanned, the size of the scanning area, and the characteristics of the scanning sensor and optics. The pattern is preferably determined so that a minimum decodable piece of a bar code located anywhere in the scanning area and at any orientation will be read by at least one virtual scan line. The virtual scan lines are mapped onto the raster pattern, allowing the pixels of the raster which fall on the virtual scan lines to be identified. As the raster scan proceeds, information regarding the intensity of the detected light is stored only for the pixels comprising the virtual scan lines. The amount of data stored is thus only a fraction of the total data in the raster.

After the pixel values have been stored for a virtual scan line, the edges of the bars and spaces crossed by the line may be determined by a suitable method such as analog or digital processing. Edge detection methods using sub-pixel interpolation can be used to reduce the number of pixels needed for a given imaging region. As only selected pixels from the sensor are processed, throughput is increased which allows for the use of more sophisticated signal processing methods. The data can be decoded by a decoder which may advantageously use the knowledge of scan line boundaries within the data stream to facilitate decoding.

In certain embodiments the invention permits complex patterns of scan lines to be read and processed by a simple, compact sensing device. The optical sensing portion of the system may be quite small and have relatively few hardware components compared to a conventional multi-line laser scanner using pattern forming mirrors or holographic beam deflection elements. Further, because only a relatively small memory is needed, the amount and size of the necessary hardware components and the corresponding cost are less than conventional two-dimensional omnidirectional scanners which read and process every pixel in a two-dimensional image. Thus, the device may be small and easily mounted on or under a checkstand, allowing improved checkstand layout. Further, the bottom of a package may be readily scanned from below the checkstand through a narrow opening, allowing all surfaces of a package to be read without the operator needing to orient the package.

In certain applications, the invention may also be embodied in a portable scanner requiring less effort on the part of the operator to orient the bar code label as compared to single line scanners, thereby improving efficiency. In another embodiment, a single line laser scanner can be used in conjunction with package movement such as that on a conveyor to achieve high resolution imaging over very large areas at a low cost. Because the sensor input may come from a two-dimensional raster scanning device, some embodiments may eliminate the need for virtually all moving parts in the scanner.

The foregoing and other objects, features, and advantages of the invention will become apparent from the following more detailed description set forth in conjunction with the accompanying drawings.

BRIEF DESCRIPTION OF THE DRAWINGS

FIG. 2B is a diagram showing the relationship of the angle used to generate the virtual scan line pattern to various bar code label dimensions.

FIG. 6B is a diagram of a tile region broken up into subtiles.

FIG. 6C is a diagram showing the pixels of interest for a virtual scan line across a subtile.

FIG. 12A-12C are diagrams showing different views of a bottom scanning conveyor system in accordance with one embodiment of the present invention.

DETAILED DESCRIPTION OF THE PREFERRED EMBODIMENT

Figure 1A:
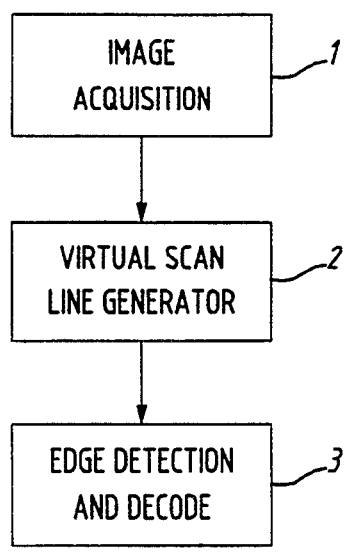
FIG. 1A is a block diagram showing a generic bar code scanning system.
Figure 1B:
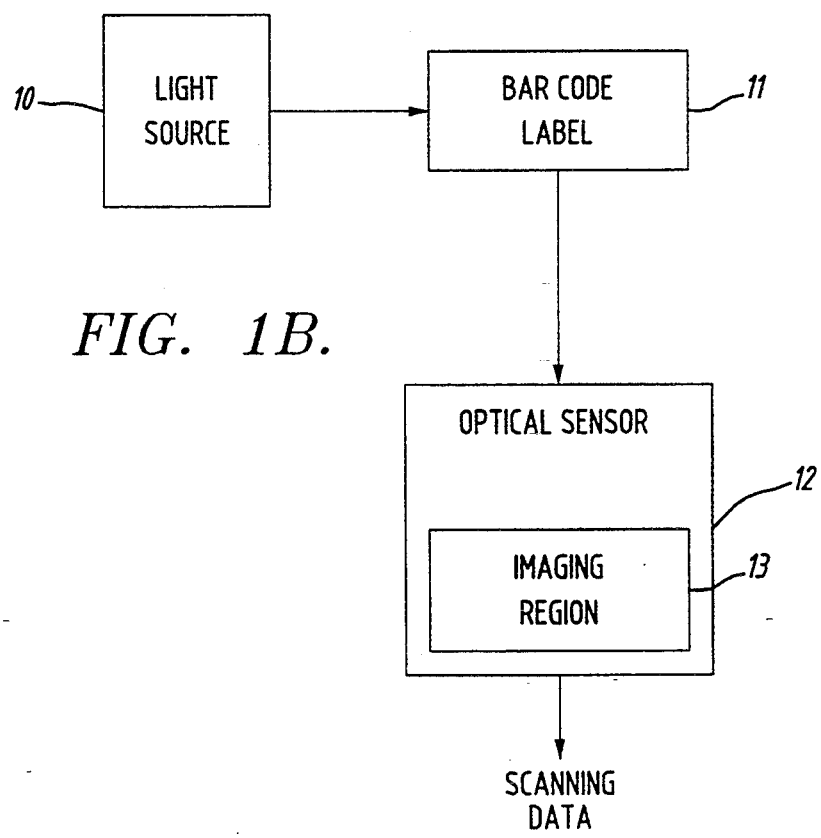
FIG. 1B is a more detailed block diagram of an image acquisition system block as depicted in FIG. 1A.

The preferred embodiment comprises a method and apparatus for reading bar code labels by efficiently selecting raster scanned input. As shown in FIG. 1A, a scanning system according to the preferred embodiment may be divided at an abstract level into an image acquisition block 1, a virtual scan line generator block 2, and an edge detection and decode block 3. Referring to FIG. 1B, the image acquisition block 1 comprises a light source 10 which illuminates a bar code label 11. An optical sensor 12 comprising optics (not shown) detects the reflected and/or refracted light from the bar code label 11. The optical sensor 12 has a planar imaging region 13 and may be, for example, a two-dimensional CCD array. Alternatively, the planar imaging region 13 of the optical sensor 12 may be a linear CCD array that obtains a second dimension of raster input by relative motion of the optical sensor 12 to the bar code label 11. The relative motion may be created by sweeping the optical sensor 12 across a bar code label 11, or by sweeping the bar code label 11 manually or automatically (e.g., by conveyor) across the optical sensor 12. In the case of a linear CCD array, one dimension of the imaging region 13 is defined by the relative motion of the optical sensor 12 to the bar code label 11 over some period of time. Although the imaging region 13 may be various shapes, a planar imaging surface is preferred. In contrast to a conventional multi-line laser scanner having a laser and mirrors, the optical sensing portion of an area scanning system may be quite small because of the relatively small size of the CCD array.

In a typical area scanner, information relating to each raster location is stored before processing. The preferred embodiment of the present invention, however, uses a minimum amount of memory storage by generating a pattern of virtual scan lines (for example, the lines L' shown in FIG. 4A) in order to increase the likelihood of capturing a bar code label 11 of a specified size, at any orientation, within the imaging region 13. The particular pattern depends upon the dimensions of the bar code labels to be scanned, the size of the scanning area, and the characteristics of the scanning sensor and optics. The pattern is designed so a minimum decodable piece 21 of a bar code label 11 which is projected anywhere in the imaging region 13, at any orientation, will be read by at least one virtual scan line.

Figure 1C:
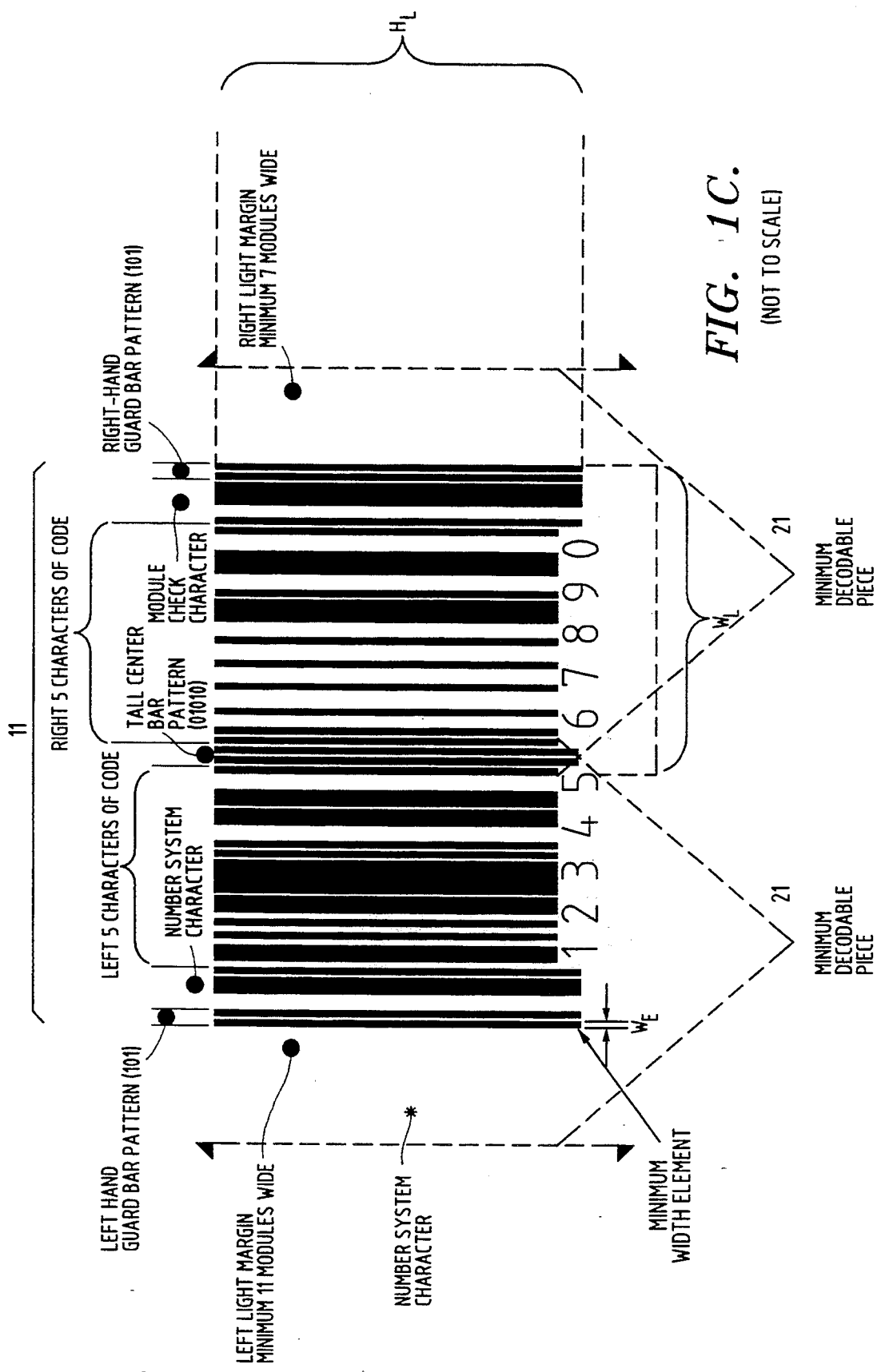
FIG. 1C is a diagram of a decodable label piece identifying the various dimensions of interest.
Figure 1D:
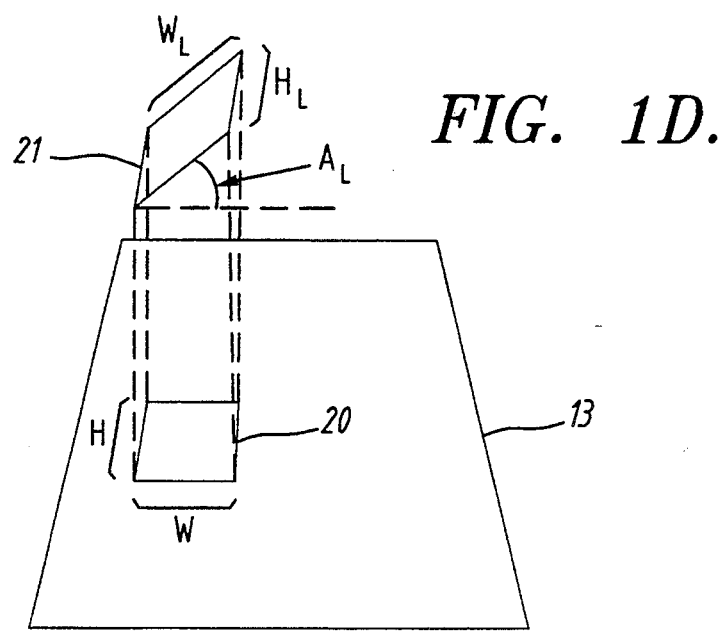
FIG. 1D is a diagram showing the projection of a bar code label or minimum decodable piece onto a raster scanning surface.

The required resolution of the system depends to some extent on the attributes of the bar code labels to be scanned. An exemplary bar code label 11 is shown in detail FIG. 1C. The bar code label 11 may be some non-planar shape, such as a curved label on a can, but a flat label is considered here. The bar code label 11 may be comprised of one or more smaller pieces 21 which are the minimum size necessary for decoding (i.e., minimum decodable pieces"). A minimum decodable piece 21 of bar code label 11 has a height $H_L$ and width $W_L$. When scanned, the bar code label 11 may not necessarily be oriented to the optical sensor 12 at a perfectly flat angle, but may be inclined at an angle $A_L$ with respect to the optical sensor 12, as shown in FIG. 1D. The result may be that the projection of the image of the bar code label 11 (or a minimum decodable piece 21 thereof) is distorted when it hits the imaging region 13. The projection 20 of the label or piece image has a height H (the "apparent height") and a width W (the "apparent width"). If the relative dimensions $H_L$ and $W_L$ of the minimum decodable piece 21 are known, and the angle of inclination $A_L$ is also known, the size of the projection 20 onto the imaging region 13 may be determined as described further below.

The bar code label 11 also has a minimum element width $W_E$ of the bar and space elements comprising it. The minimum apparent bar code element width $W_{MIN}$, which affects the preferred characteristics of the imaging region 13, may be derived from the minimum bar code element width $W_E$ as described further below.

Figure 1E:
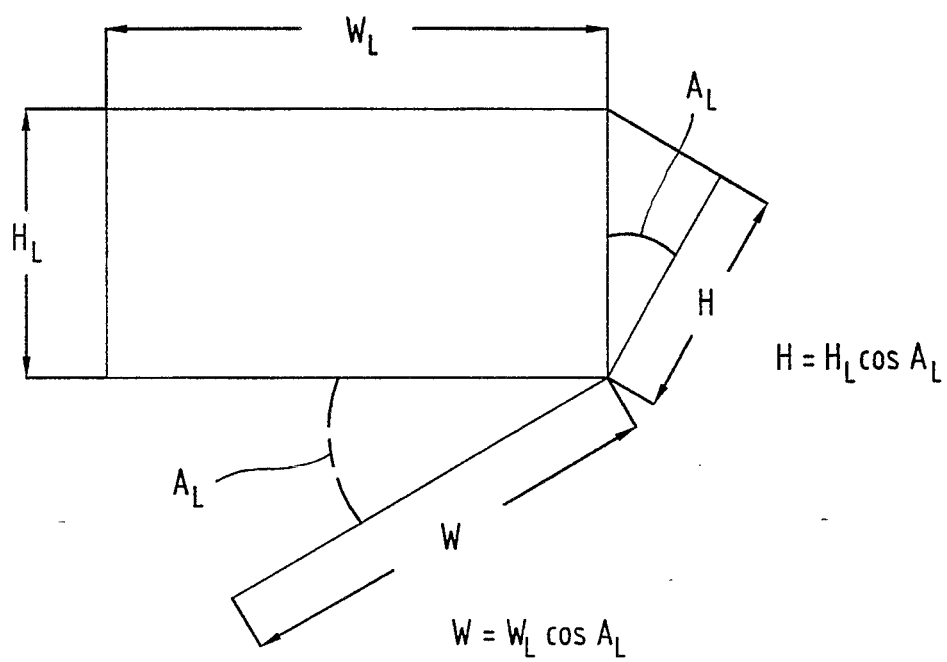
FIG. 1E is a diagram showing the dimensions of the projection described in FIG. 1D.
Figure 1F:
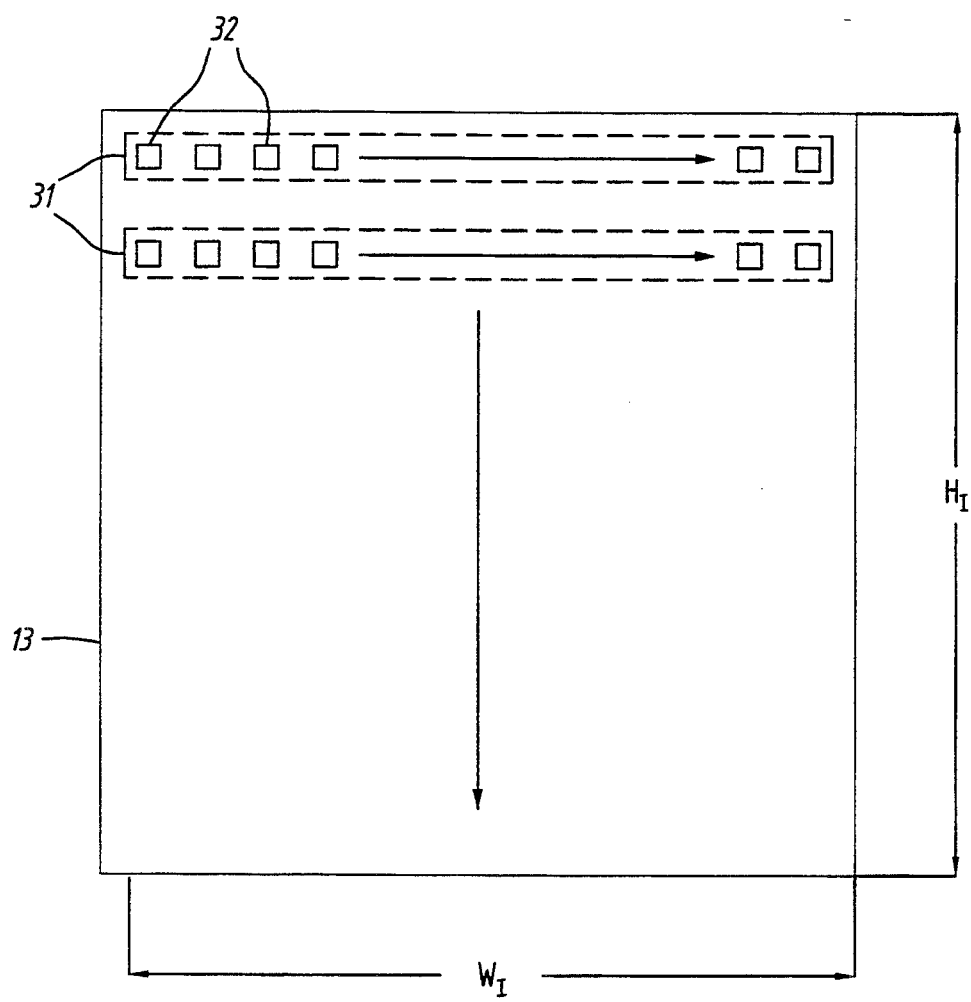
FIG. 1F is a diagram of an imaging region upon which a bar code image may be projected.

In some applications it may be desirable to determine the number of pixels needed or the required size of the imaging region 13 given a particular set of bar code labels to be read. FIG. 1F shows a more detailed diagram of the imaging area 13 as a two-dimensional raster area map corresponding either to a CCD array sensor or a CCD line array sweeping vertically to yield a number of parallel sample lines. The imaging area 13 is essentially a grid comprised of rows 31 (referred to as "lines") of pixels 32.

In some cases the number of pixels 32 (i.e., sample points) may be known and the size of the imaging region 13 will need to be determined. In other cases, the size of the imaging region 13 will be known and the required number of pixels 32 will need to be determined. In either case, such determinations may be made if values are known for the minimum apparent bar code element width $W_{MIN}$, the maximum angle of incidence $A_L$ between the bar code label 11 and the plane of the imaging region 13, and the minimum number of pixels $P_N$ per label element (i.e., imaging resolution).

Figure 1G:
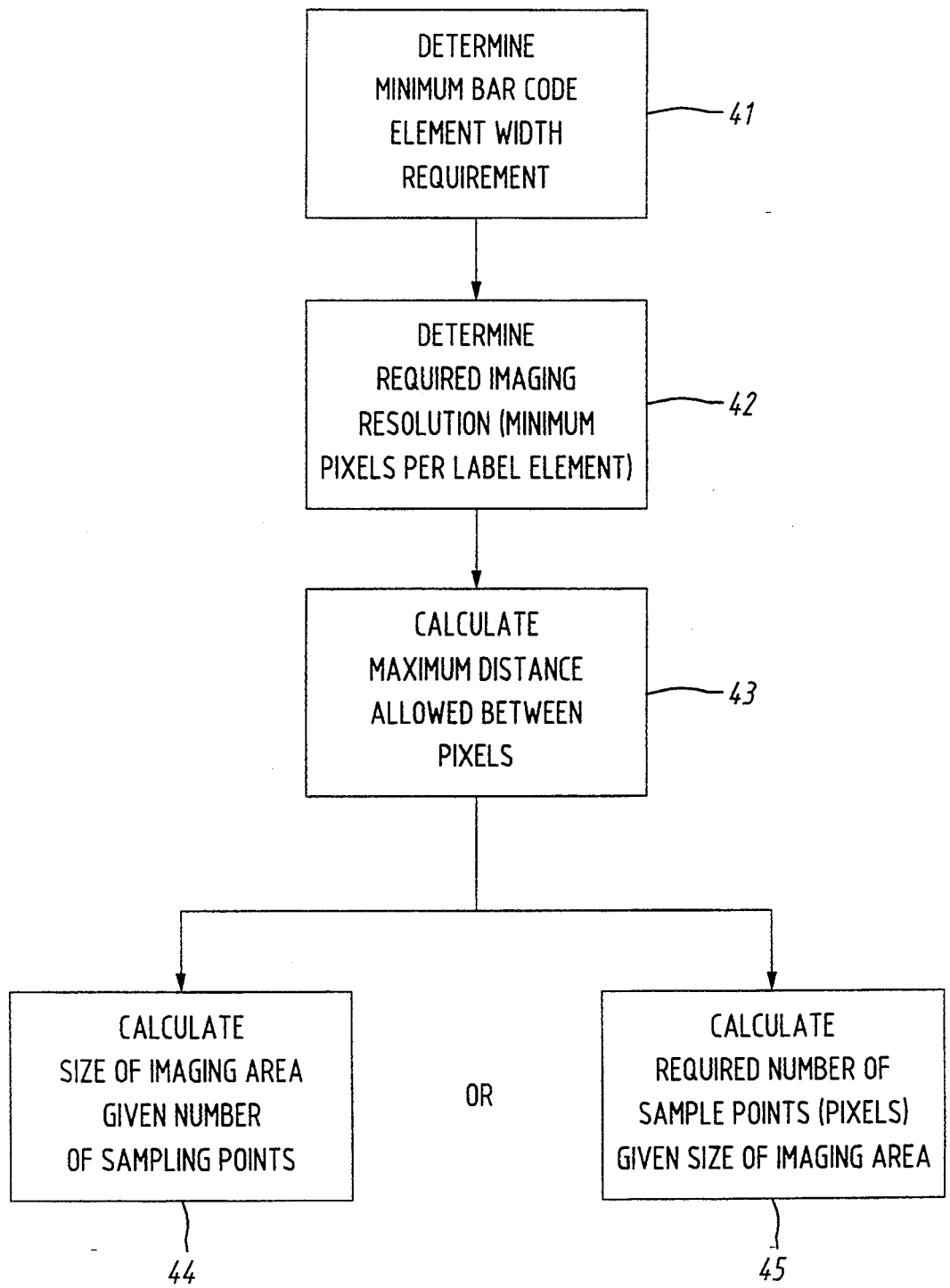
FIG. 1G is a flow chart for determining imaging region characteristics.

FIG. 1G shows a flowchart for making the above determinations. The first step, block 41, is to determine the minimum bar code element width requirement. The minimum apparent bar code element width $W_{MIN}$ is dependent upon the sizes of the bar codes that are to be read and is derived from the narrowest allowed bar or space dimension specified by the bar code specifications. The minimum apparent bar code element width $W_{MIN}$ is affected by the angle of incidence $A_L$ between the image of the bar code label 11 (or minimum decodable piece 21 thereof) and the imaging region 13. If the maximum angle $A_L$ of incidence is known, the minimum apparent bar code element width $W_{MIN}$ is given by the equation:

$$W_{MIN} = W_E * \cos(A_L)$$

For example, the narrowest allowed bar or space dimension for the UPC/EAN/JAN bar codes is 0.0104 inches (not considering allowable print distortion). Given an incident angle of 45 degrees, the minimum apparent bar code element width $W_{MIN}$ is 0.00735 inches.

Next, in block 42, the required imaging resolution is determined by reference to the minimum number of pixels $P_N$ required per label element. The minimum number of pixels $P_N$ per label element is determined by the type and capability of the edge detection methods used in the system. Edge detection signal processing generally introduces some distortion as to the location of the actual bar and space edges. In a perfect system with no distortion, only two pixels per cycle (one pixel per minimum element) would be required as per Nyquist limits. However, as a practical matter 1.5 to 2.0 pixels per minimum element are likely required.

There are various methods of edge detection. In conventional methods, in systems such as handheld CCD imagers where the operator manually aligns the scanner to the barcode, each pixel is assigned either a "black" or "white" level upon reading. The bar code element widths are represented by the number of consecutive black or white pixels read by the scanner. These consecutive pixel counts are used for later decoding. Thus, conventional methods require that the scanner have a fairly large number of pixels per narrow bar code element. For example, ten or more pixels per element would be desirable in a UPC code reader, giving a ±10% error in the measured narrow element width due to quantization effects alone.

The preferred embodiment uses more complex analog or digital signal processing methods for determining edge location to sub-pixel resolution. Fewer pixels per label element are needed with sub-pixel edge detection methods, allowing a larger imaging area for a given sensor size, or a smaller, lower cost sensor for the same imaging region.

In general, sub-pixel edge detection involves the determination of image intensity at intermediate positions between pixels (also called "interpolation") before applying the usual edge detection techniques. There are various methods whereby edge location may be determined to sub-pixel resolution. In one method, the pixel data is converted back to an analog signal by an analog-to-digital ("A/D") converter followed by a low pass filter. Ideally, such a filter would have a (sin x)/x shaped impulse response, but because of practical limitations the preferred system would use some approximation to a (sin x)/x impulse filter. See generally "Multirate Digital Signal Processing" by R. Crochiere and L. Rabiner (Prentice-Hall 1983). An edge detection process then converts the signal back to a digital signal, with the black/white edge positions determined to an accuracy which is limited by the amount of noise and distortion in the analog signal.

In a second method, the sampled digital signal is digitally interpolated to form a new signal at a higher sample rate or sample density. This interpolation process also requires a low pass filtering operation, but the new signal is still a sampled signal. The new signal, however, has more sample points than the original signal, preferably at least four more samples per time interval than the original signal. The edge detection operation can then be performed directly in the digital domain, or after conversion to an analog signal.

In a third method, a linear interpolation or other higher-order curve fitting operation may be performed to estimate the value of the signal between the original sample points. These methods may require less computation than digital interpolation but are generally less accurate.

The next step, block 43, is to determine the maximum distance allowed between pixels. The pixel spacing is derived from the minimum element width $W_{MIN}$, the minimum number of pixels $P_N$ required per label element, and the diagonal angle $A_P$ between pixels positioned diagonally from one another on adjacent rows. For example, if the pixels are spaced the same in both the horizontal and vertical directions, the maximum allowed pixel spacing is measured at a 45 degree diagonal between pixels. The maximum distance $D_P$ allowed between pixels is then given by:

$$D_P = \cos 45° * W_{MIN}/P_N$$

As an example, using the same values for $W_{MIN}$ and $P_N$ shown above, the maximum spacing along a 45 degree diagonal between pixels would be $0.00735/1.5 = 0.0049$ inches, and the maximum distance $D_P$ allowed between pixels would therefore be $0.0049 * \cos 45° = 0.00347$ inches between pixels (columns) and between lines (rows).

The maximum allowed distance between pixels $D_P$ may then be used to calculate the size of the imaging region 13 or the required number of pixels 32 as desired. If it is desired to calculate the size of the imaging region, then block 44 is performed. The size of the imaging area 13 is calculated given the number of vertical sample points $N_v$ and horizontal sample points $N_H$. The height $H_I$ and width $W_I$ of the imaging area 13 are given by:

$$H_I = N_V * D_P$$

$$W_I = N_H * D_P$$

For example, if each raster line contains 1024 pixels and the raster contains 512 lines (i.e., rows), then the dimensions of the imaging area 13 would be $H_I = 3.55$ inches by $W_I = 1.77$ inches.

On the other hand, if it is desired to determine the required number of sample points given a specified size of the imaging area 13 having a height $H_I$ and a width $W_I$, then block 45 is performed. The number of vertical sample points $N_v$ and horizontal sample points $N_H$ are given by:

$$N_V = H_I/D_P$$

$$N_N = W_I/D_P$$

For example, if the imaging area is 4 inches high by 5 inches wide, then the required number of pixels would be 1154 pixels vertically by 1442 pixels horizontally.

Figure 2A:
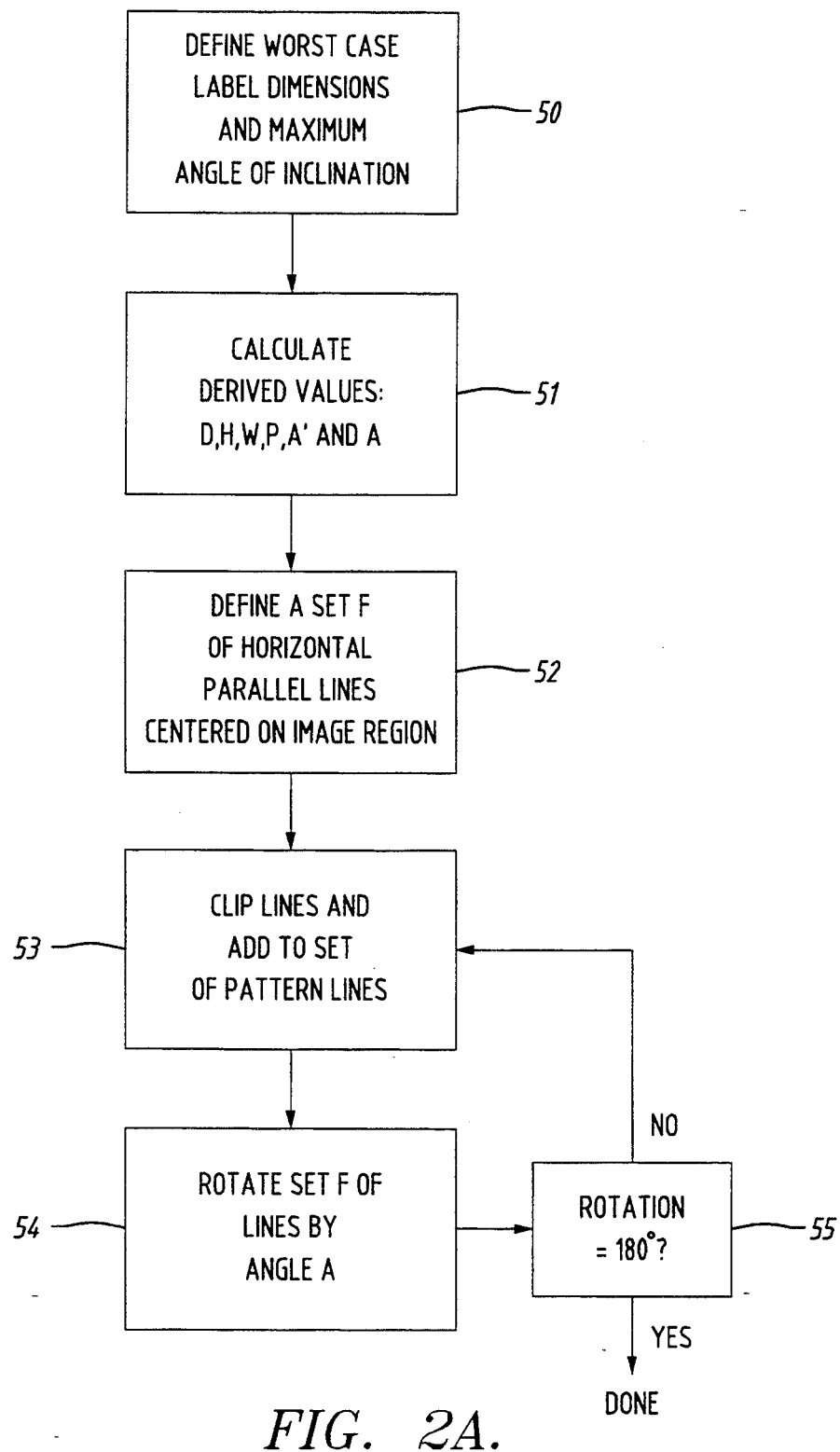
FIG. 2A is a flow chart for generation of scanning patterns in accordance with one embodiment of the present invention.
Figure 3A:
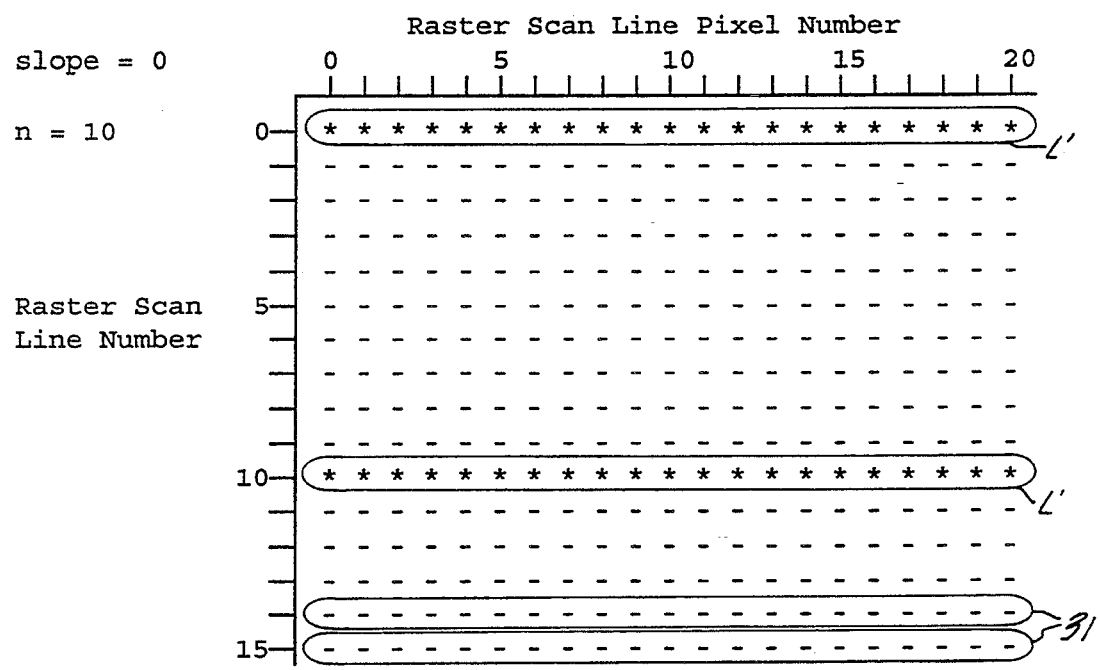
FIGS. 3A-3S are raster maps depicting exemplary single virtual scan lines generated in accordance with the method described in FIG. 2A.
Figure 3B:
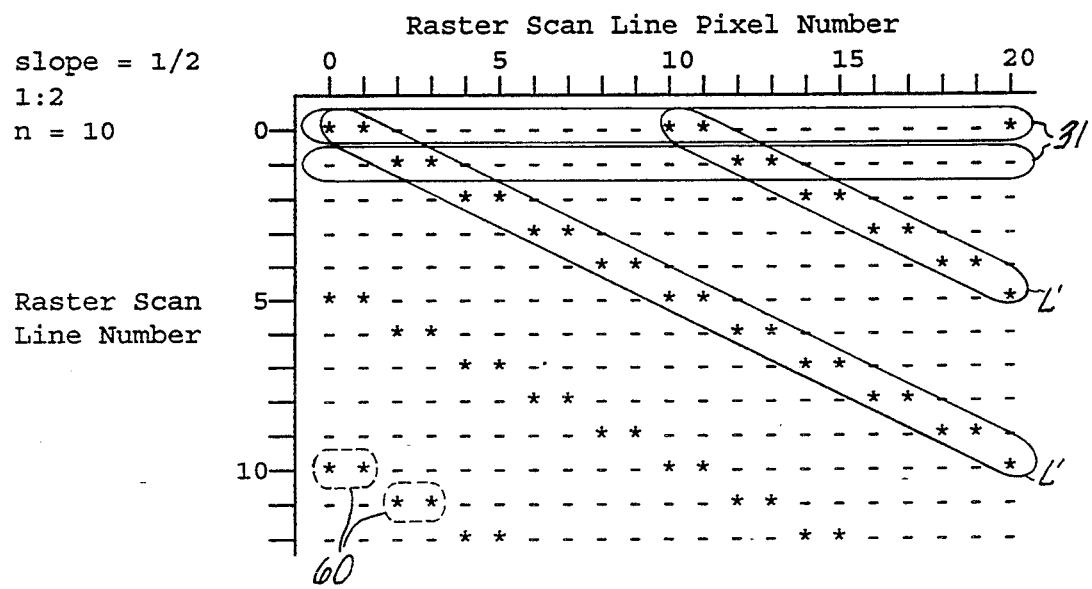
Figure 3C:
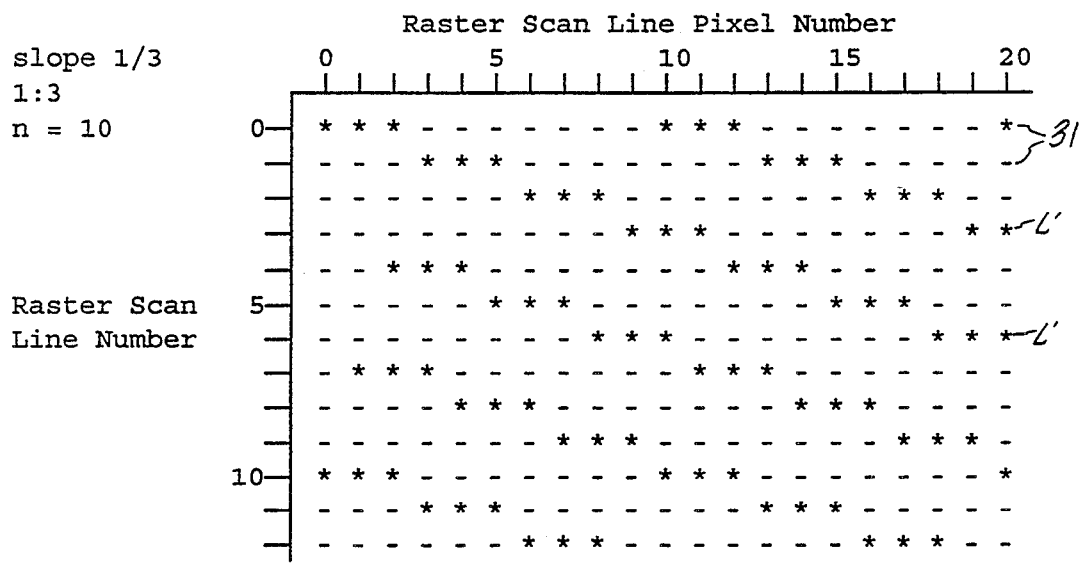

FIG. 2A shows a flow chart for defining a virtual scan line pattern. (Attached hereto in a Microfiche Appendix is a copy of source code for a program entitled "pattern.c" written in the computer language "C" and implementing an algorithm in accordance with a preferred embodiment of the present invention for determining a pattern of lines given certain label characteristics). Examples of parts of individual virtual scan lines are shown in FIGS. 3A–3S, and complete scan patterns are shown in FIGS. 4A–4C. The pattern of virtual scan lines may be automatically generated by a computer or similar device. The method of virtual scan line pattern generation generally consists of forming a family of substantially parallel lines of a given separation, then rotating the family of lines at a specified angle until the entire imaging area is covered such that a bar code label fitting certain criteria should ordinarily be captured in a single scanning pass.

As shown in FIG. 2A, the first step, block 50, is to define the worst case label dimensions and maximum angle of inclination $A_L$ (mentioned above with respect to FIGS. 1D and 1G). These parameters are dependent upon the particular application and are given the following definitions:

$H_L$ = minimum expected actual label height for a label with minimum element widths $W_L$ = minimum expected actual width of a decodable label piece for a label with minimum element widths (e.g., a UPC label half or a complete C39 label) having the minimum ratio of $H_L$ to $W_L$ which will occur in the particular application $A_L$ = maximum angle of inclination of label to imaging plane The imaging region 13, as shown in FIG. 1F, is defined by a height $H_I$ and a width $W_I$.
$H_I$ = height of imaging region
$W_I$ = width of imaging region
Given the above parameters, other useful parameters can be calculated in the next step, block 51, of the flowchart for generating a pattern of virtual scan lines. As described previously with reference to FIG. 1D, the angle of inclination $A_L$ affects the size of the projection 20 onto the imaging region 13. Because the bar code label 11 may be tilted at an angle $A_L$ to the imaging region 13, the apparent size of a minimum decodable piece 21 of the bar code label 11 may be narrower (if the width is affected) or shorter (if the height is affected) than the actual height and width. Thus, the apparent size of the bar code label 11 (or a minimum decodable piece 21 thereof) may be smaller than the actual size. FIG. 1E shows the effect of angle of inclination on the apparent dimensions of a minimum decodable piece 21 of a bar code label 11. The relationship of the minimum apparent label height H and maximum apparent decodable label piece width W to the actual dimensions is given by:

$H = H_L * \cos(A_L)$ $W = W_L * \cos(A_L)$

These values are used in the next step, block 51 of the flow chart, to determine other parameters which will help define the families of lines to be generated. These parameters include the virtual scan line pitch P (i.e., the distance between parallel lines), the maximum allowable angle A' between families of scan lines, and largest angle A less than A' which divides into 180 degrees with no remainder. The first two of these parameters are calculated as follows:

$P = H/2$ $A' = 2* \arctan(\text{i } H/2W)$

The virtual scan line pitch P, or distance between the parallel lines, is preferably less than or equal to one-half the minimum apparent label height H to ensure that any bar code label for the given application will be completely traversed by at least one virtual scan line. It may be noted that the virtual scan line pitch P is defined by the minimum apparent label height H, which is in turn dependent upon the minimum expected label height $H_L$. Consequently, the virtual scan line pitch P may be adjusted to allow reading of truncated labels which otherwise could be difficult to read in conventional systems.

The maximum allowable angle A' between families of scan lines is also given by the equation set forth above (twice the arctangent of the minimum apparent label height H divided by twice the corresponding maximum apparent decodable label piece width W). In other words, as shown in FIG. 2B, the maximum allowable angle A' is twice the interior angle A" defined by the base and the diagonal of the rectangle having dimensions H/2 and W. It should be noted that, according to the definition of $W_L$, the values of the apparent height H and width W are derived from the worst-case label dimensions $H_L$ and $W_L$ having the lowest ratio of $H_L$ to $W_L$. On the other hand, the pitch P is determined simply using the minimum expected apparent label height H. Thus, it is possible to use one value of label height $H_L$ to calculate the pitch P and a different value of height $H_L$ to calculate the maximum allowable angle A'.

Instead of using the maximum allowable angle A' to generate a family of virtual scan lines, however, a smaller angle A is defined as the largest angle less than the maximum allowable angle A' which divides into 180 degrees with no remainder. The angle A must be smaller than the maximum allowable angle A' for the accuracy of the scanning pattern not to be reduced. The reason that the angle A divides into 180 degrees is to provide symmetrical coverage of the imaging region 13 when, as explained below, the family of lines is rotated to produce the scanning pattern.

In order to ensure that the virtual scan lines will traverse the entire imaging area 13, the length of the virtual scan lines is selected (prior to clipping, as explained below) as the diagonal measurement D of the imaging area 13. The diagonal D is given by the equation:

$D = \sqrt{(H_I^2 + W_I^2)}$

Figure 2C:
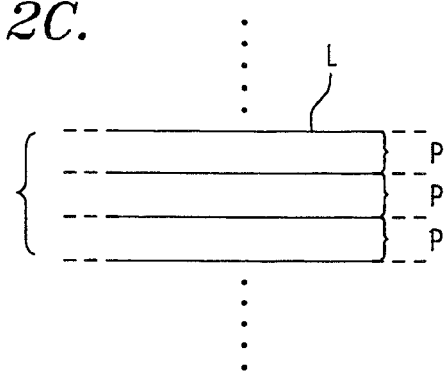
FIG. 2C is a diagram of a family of parallel lines generated in accordance with the method described in FIG. 2A.
Figure 2D:
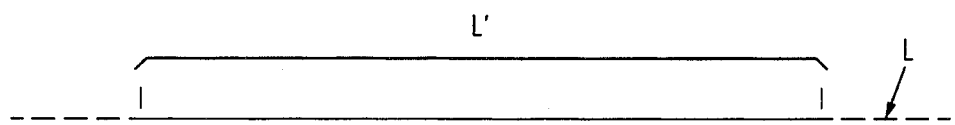
FIG. 2D is a diagram showing families of virtual scan lines generated in accordance with the method described in FIG. 2A.
Figure 2D:
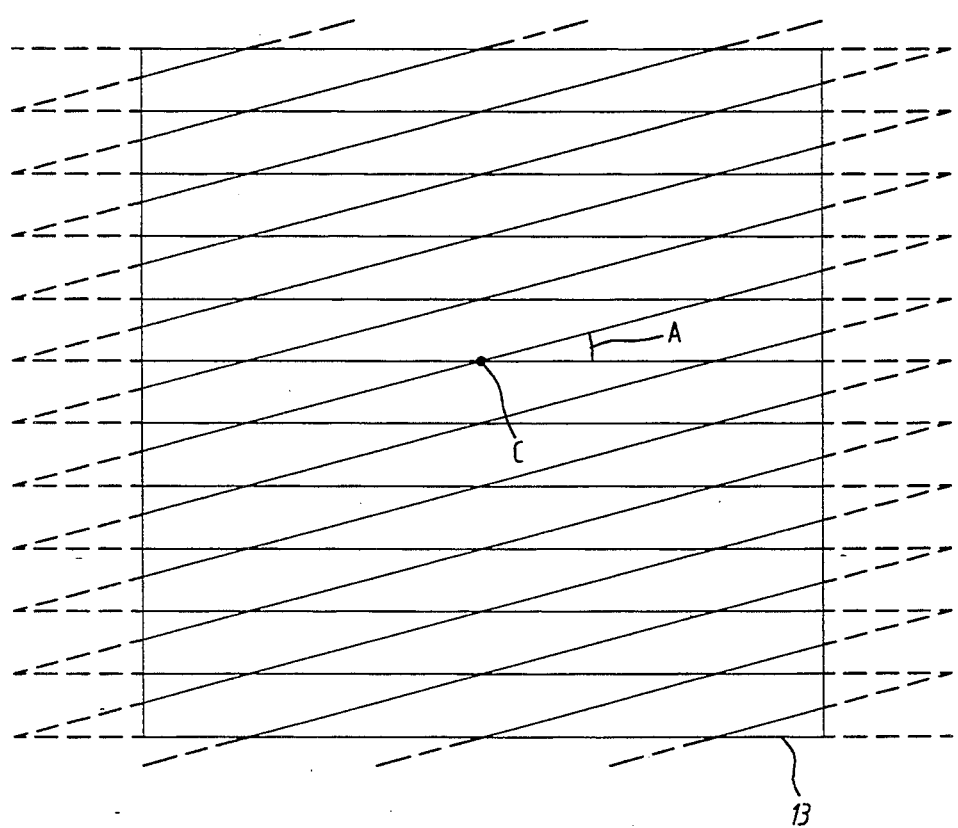

Once the above parameters have been determined, a pattern of virtual scan lines such as those shown in FIGS. 4A–4C may be generated. The next step, block 52 of the flow chart, is to define a set F of horizontal parallel lines L of length D. As shown in FIGS. 2C and 2D, the lines L are spaced a distance P apart over an area the height and width dimensions $H_I$ and $W_I$ of the imaging region 13, and centered on the image region 13. For each line L in the set F, a corresponding line L' is generated whose endpoints have been clipped to the boundaries of the image region 13. Each clipped line L' is added to a set S of pattern lines. An example of a completed set S of pattern lines is shown by the collection of lines L' in FIG. 4A.

Figure 4A:
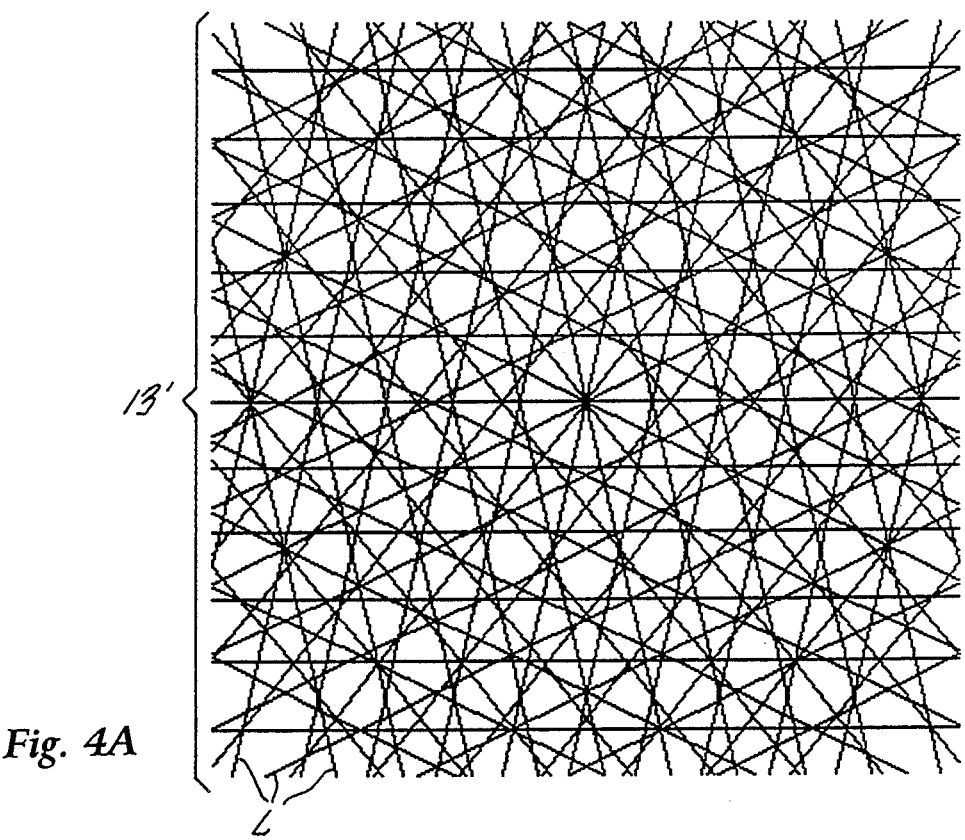
FIGS. 4A-4C are complete sample scanning patterns of virtual scan lines.
Figure 4B:
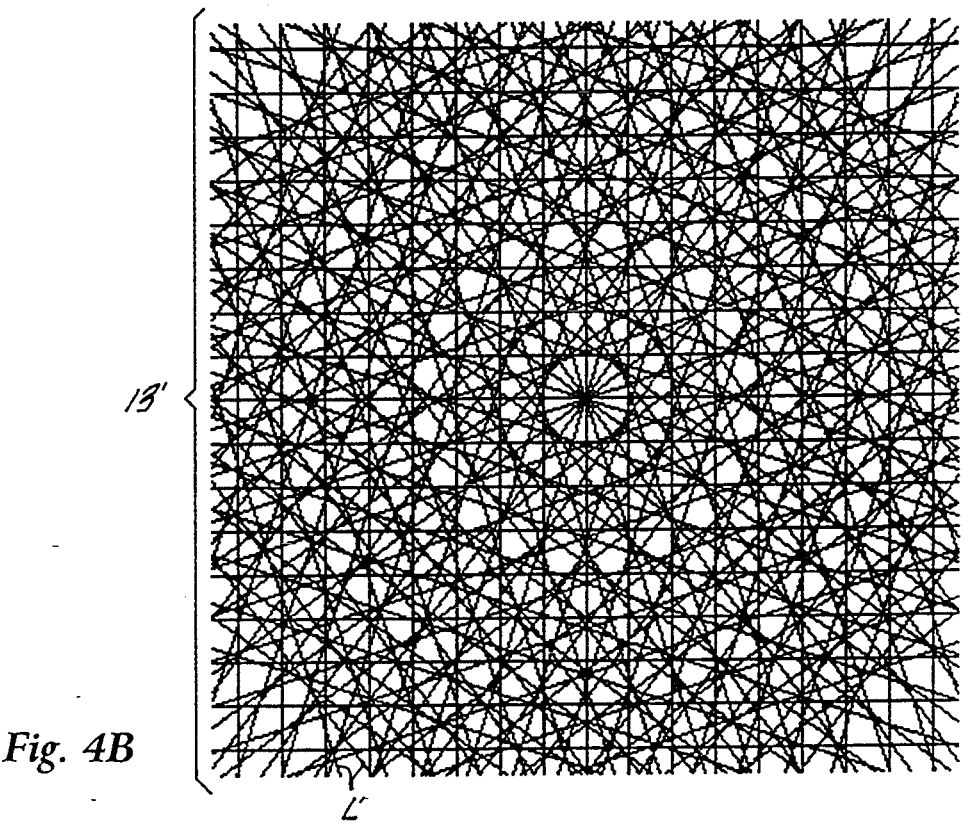
Figure 4C:
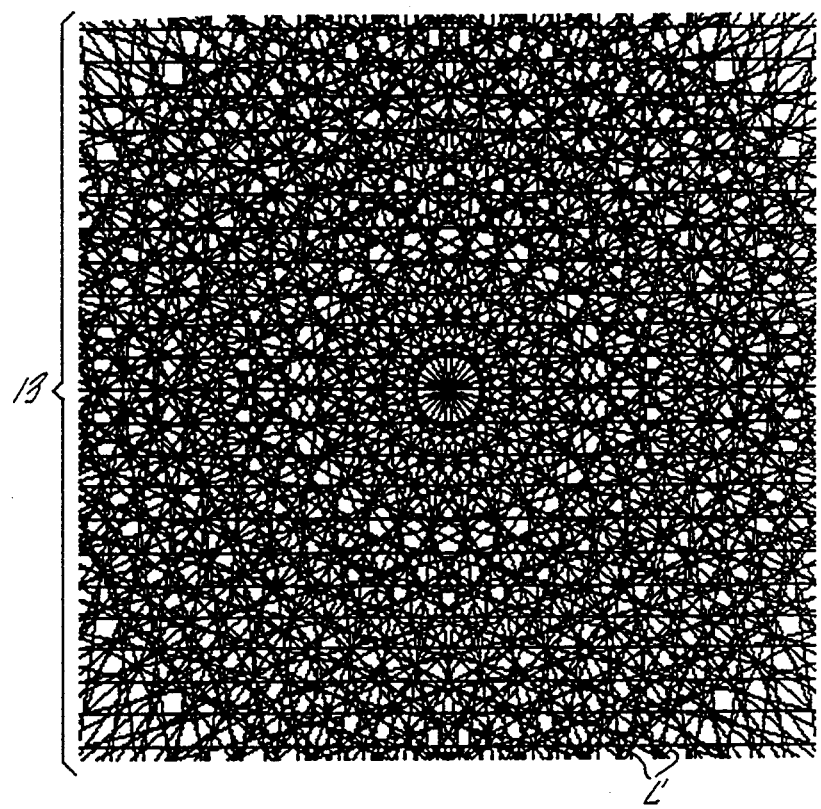
Figure 4D:
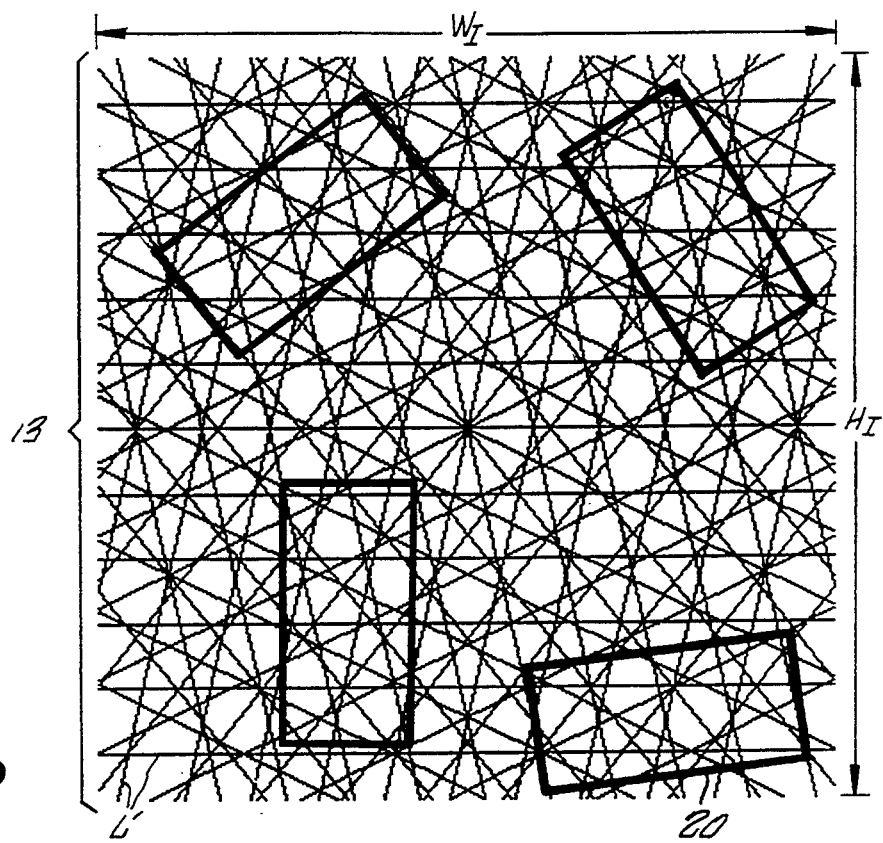
FIG. 4D is a sample scanning pattern superimposed with the outlines of projected bar code label images at various orientations.

The next step, block 54 of the flow chart, is to rotate by an angle A the set F of parallel lines L about the center C of the image region 13. The direction of rotation is not important provided it is consistent. Again, for each line L in the set F, a corresponding line L' is defined whose endpoints have been clipped to the boundaries of the image region 13, and each clipped line L' is added to the set S of pattern lines. As indicated by the following step, block 55 of the flowchart, the set F of parallel lines L is again rotated and the above steps (blocks 53 and 54) repeated until the set F has been rotated 180 degrees. The resulting set S of pattern lines generates a pattern such as shown in FIGS. 4A–4C. FIG. 4A shows a pattern of scan lines; generated with 7 families of lines (A=25.7°); FIG. 4B shows a denser pattern of scan lines generated with 10 families of lines (A=18.0°); FIG. 4C shows an even denser pattern of scan lines generated with 13 families of lines (A=13.8°). An example of showing in various alignments the projection 20 of a bar code label 11 (or a minimum decodable piece 21 thereof) upon a pattern of scan lines is depicted in FIG. 4D.

To improve the likelihood of reading labels with defects, additional scan lines may be added to the pattern. For example, additional scan lines may be added by decreasing the virtual scan line pitch P, or by decreasing the rotation angle A.

The scan pattern may be modified to optimize some property which simplifies the design of the system. For example, it may be desirable to design a pattern in which any particular pixel will not be used in more than some maximum number of virtual scan lines. Methods of doing this include using suitable rules for automatic pattern design, possibly followed by manual optimization of the pattern to remove line intersections by moving lines. The number of intersections can also be reduced by translating an intermediate point on a line without moving the original endpoints, by replacing a line with two or more line segments which are nearly parallel, and have a common endpoint.

The pattern of virtual scan lines may also be optimized manually to increase the likelihood of obtaining a successful read in a single pass. Selected virtual scan lines may be translated and/or rotated slightly to eliminate points in common with other virtual scan lines, increasing the probability that the label will be read by covering more scanning area. Another optimization method involves replacing a single virtual scan line with two shorter virtual scan lines, one from an original end point to a selected point slightly displaced from the original scan line, and a second from the displaced point to the second original end point. These manual optimization methods may be particularly useful where concentrations of lines over a single pixel may cause memory storage problems in some implementations.

Once the virtual scan line pattern is determined, the scan data are read, stored and processed during a read cycle. As described above, the virtual scan lines are mapped onto the raster pattern, allowing the pixels of the raster which fall on the virtual scan lines to be identified. These pixels will be referred to as the "pixels of interest". The pixels of interest will be only a fraction of the total pixels. For example, given a raster area of 1024 by 1024 pixels (a total of 1,048,576 pixels), the pattern shown in FIG. 4A would cover only 78,475 pixels (i.e., less than 8% of the total pixels).

During the scanning process, only the pixels of interest are stored as the raster scan proceeds. The preferred embodiment does not use a separate linear CCD array for each virtual scan line L'. Rather, the scan proceeds serially along the first raster line 31, then serially along the second raster line 31, and so on until all the raster lines 31 are read. A typical pixel scanning rate is 10 Megahertz. Although pixels 32 are scanned serially, only those which fall on a virtual scan line are stored in memory. Preferably, it should therefore be known in advance whether a particular pixel 32 is a pixel of interest. Furthermore, means are preferably provided to identify the pixel 32 with a particular virtual scan line once the pixel 32 has been read and stored for later processing.

Figure 5:
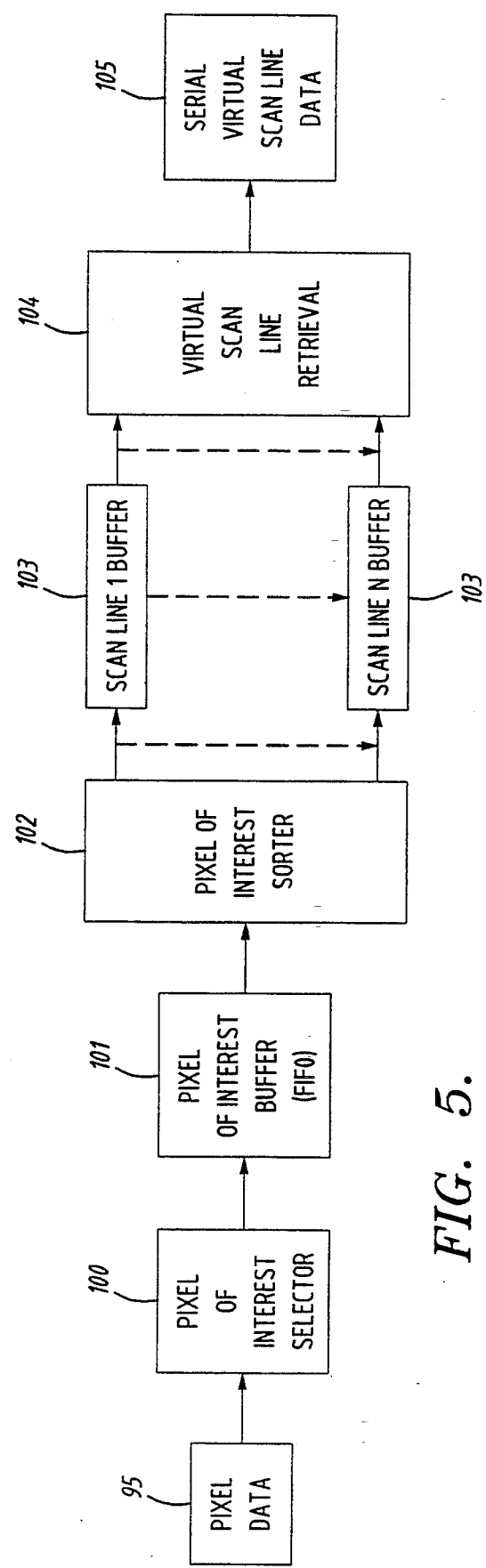
FIG. 5 is a functional block diagram of a system in accordance with one embodiment of the invention.

A more detailed block diagram of the selection and storage system is provided in FIG. 5, corresponding to the virtual scan line generator block 2 in FIG. 1. The selection and storage system comprises a pixels of interest selector 100, a pixel of interest buffer 101, a pixel of interest sorter 102, scan line buffers 103 (one for each virtual scan line), and a virtual scan line retrieval block 104. Pixel data 95 from a CCD array or other input is provided to the pixel of interest selector 100 which determines whether the particular pixel is one of interest. Rather than storing the data directly into the virtual scan line buffers 103, the pixel of interest selector 100 stores the data in an intermediate pixel of interest buffer 101. Because the raster scan typically proceeds at a very rapid rate (e.g., 10 MHz), the intermediate buffer 101 is provided to facilitate the storage of pixel data without the loss of data. For example, a bottleneck in transferring pixel data to scan line buffers 103 may otherwise occur where consecutive pixels are pixels of interest, or where a single pixel is one of interest to more than one virtual scan line. The intermediate buffer 101 provides temporary storage of pixel data so that it may be stored systematically by the pixel of interest sorter 102. The intermediate buffer 101 may be a first-in-first-out ("FIFO") buffer. The minimum allowable size of the intermediate buffer 101 is a function of the virtual scan line pattern, the raster data rate, and the pixel storage rate; the larger the intermediate buffer 101, the better able it is to handle bursts of data. Typically, an intermediate buffer 101 capable of storing approximately 64 pixels of data should be sufficient to allow proper storage of selected data for a system with 16 families of lines, a virtual scan line pitch P of 50 pixels, a 10 MHz data input rate, and an 80 nanosecond storage cycle time.

The pixels 32 comprising each virtual scan line L' are stored as a separate list of data values in scan line buffers 103. The stored data represents the intensity of the detected light of each pixel forming a part of the virtual scan line L'. Thus, a separate list of intensity values exists for each virtual scan line. Within each list, the data values are stored in the order that they could have been scanned by a conventional laser scanner with a very complex scan pattern. The pixel of interest sorter 102 determines which line or lines of the scan line buffers 103 in which to store the pixel data.

The pixel of interest selector 100 makes the initial determination whether a given pixel 32 is a pixel of interest. (Attached hereto in a Microfiche Appendix is a copy of source code for programs and supporting functions entitled "proto2.cpp", "poi.cpp", "tilefunc.cpp", "poi.h" "fifo.h" "video.h" and "pcvision.h" written in the computer language "C" and implementing an algorithm in accordance with a preferred embodiment of the present invention for selecting pixels of interest).

Terminology and convention pertinent to the pixel selection function will now he explained. Referring again to FIG. 1F, each raster scan line 31 is scanned left to right. Successive raster lines 31 are scanned from top to bottom to cover the imaging region 13. The raster scan lines 31 are identified by an increasing number from the top to the bottom of the imaging region 13. The pixels 32 along a raster scan line 31 are identified by increasing numbers from left to right. The term "rise" refers to vertical measurement (in number of lines). The term "run" refers to horizontal measurement (in number of pixels). The term "slope" refers to the rise/run ratio of a virtual scan line L' relative to the horizontal of the imaging area 13. For virtual scan lines L' with a slope less than 1 (i.e., less than 45 degrees), rise is defined to be "1". For virtual scan lines L' with a slope greater than 1 (i.e., greater than 45 degrees), run is defined to be "1".

Pixels of interest are identified according to the particular line family F. In essence, the virtual scan lines L' are translated from mathematical expression to specific pixel locations on a discrete grid or imaging region 13 such as that shown in FIG. 1F. Because of this translation, the virtual scan lines L' are not perfectly linear, but instead are approximations of perfect lines formed by small patterns of variously sized pixel groups relatively positioned from one raster line 31 to the next line 31 based on the slope of the; particular virtual scan line L'. In order to facilitate the implementation of algorithms for selecting pixels of interest, the families of parallel virtual scan lines L' can be categorized into the following twelve family types:

Positive sloping virtual scan lines (increasing pixel number, increasing line number):

1 0 degrees, parallel to the raster scan lines (slope=0)
2 >0 and <27 degrees to the raster scan lines, unit rise, integer run (slope=1/i)
3 >0 and <45 degrees to the raster scan lines, unit rise, non-integer run ( slope=1/x)
4 45 degrees to the raster scan lines (slope=1)
5 >63 and <90 degrees to the raster scan lines, integer rise, unit run (slope=i)
6 >45 and <90 degrees to the raster scan lines, non-integer rise, unit run (slope=x)
7 >90 degrees, perpendicular to the raster scan lines (slope=infinity)

Negative sloping virtual scan lines (decreasing pixel number, increasing line number):

8 >0 and <27 degrees to the raster scan lines, unit rise, negative integer run (slope=1/−i)
9 >0 and <45 degrees to the raster scan lines, unit rise, negative non-integer run (slope=1/−x)
10 45 degrees to the raster scan lines (slope=−1)
11 >63 and <90 degrees to the raster scan lines, integer rise, negative unit run (slope=−i)
12 >45 and <90 degrees to the raster scan lines, non-integer rise, negative unit run (slope=−x) In the above table, "i" is a positive integer, "x" indicates a positive non-integer greater than one, and positive slope is defined-to be increasing from the horizontal axis in a clockwise direction (as opposed to a counterclockwise direction). For example, FIG. 3B shows a virtual scan line L' having a positive slope of ½, while FIG. 3M shows a virtual scan line having a negative slope of −3.

Examples of the twelve family types of virtual scan lines are shown in FIGS. 3A–3S. FIGS. 3A–3S depict portions of virtual scan lines with respect to the raster grid of the imaging area 13 shown in FIG. 1F. Only the origin area of the imaging area 13 is shown in the FIGS. 3A–3S, but the area can be extended to the desired boundaries. With reference to the twelve family types, an exemplary algorithm is provided below for identifying pixels of interest as a raster scan proceeds. For purposes of the following explanation, "n" is the number of pixels 32 separating the parallel virtual scan lines L' along a raster scan line 31. The value of n depends upon the line spacing or pitch P of a given family F of virtual scan lines, the angle A of the family of virtual scan lines relative to horizontal of the imaging area 13, and the distance Dp between pixels along the raster scan line, as follows:

$n = P * D_p / \sin A$

An arbitrary value of n=10 is used in FIGS. 3A–3S. It is assumed in the examples shown in FIGS. 3A–3S that the pixel-to-pixel distance along the raster scan line is equal to line-to-line distance. The rise and run values were chosen symmetrically to distribute 16 families of virtual scan lines upon the image region 13. In FIGS. 3A–3S, the "−" symbol denotes a pixel not of interest to the particular family F, and a "*" symbol denotes a pixel of interest to the particular family F.

In accordance with the pixel of interest selection algorithms described in more detail below, as a raster scan proceeds, pixels of interest are selected either singly or, if consecutive, then in "groups". An example of single pixels of interest is shown in FIG. 3H, in which no scan line has more than one consecutive pixel of interest as the pixels of a given line 31 are read from right to left. An example of a "group" of pixels is shown in FIG. 3B. As pixels are read from right to left, there will be more than one pixel of interest appearing consecutively in a group 60.

All single pixels of interest along each raster scan line 31 start n pixels apart along each raster scan line 31. Thus, once an initial pixel has been selected from the start of the raster scan line, every $n^{th}$ pixel will also be selected. Returning to the example shown in FIG. 3H, the initial selected pixel on each scan line will differ. For lines 0 and 1, the initial selected pixel is the first pixel; for lines 2 and 3, it is the second pixel; and so on.

All groups 60 of pixels of interest along each raster scan line 31 also start n pixels apart. Thus, once an initial pixel has been selected from the start of the raster scan line 31, groups 60 of pixels of a specified size will also be selected starting n pixels apart. Returning to the example shown in FIG. 3B, for lines 0 and 5 the first pixel of interest for the first group starts at pixel 0. A group 60 of two consecutive pixels (pixels 0 and 1) are selected. The next group 60 of pixels of interest on lines 0 and 5 start n pixels along the scan line, at pixel 10, whereupon a group 60 of two more consecutive pixels is selected.

Referring again to the table of virtual scan line family types set forth previously, it may be noted that rise and run values may either be integral or non-integral. The significance of integral and non-integral rise or run is the effect on group size(s). Group size is defined as the number of consecutive pixels in a given row or column within a virtual scan line. If both rise and run are integers, then group size will be constant—i.e., there will be one group size that is repeated from line to line or column to column (see, e.g., FIG. 3C). If either rise and run are non-integers, then there will be two or more group sizes that are sequentially repeated from line to line or column to column (see, e.g., FIG. 3E). Thus, as an example, if rise=1 and run=3, the size of a group would be 3, as shown in FIG. 3C. If, on the other hand, rise=1 and run=1.33, there would be multiple group sizes of 2, 1 and 1, as shown in FIG. 3F. Groups may be vertical if the rise is non-integral. For example, if rise=2.25 and run=1, there would be multiple group sizes of 2, 2, 2, and 1.

Thus, for a family F of lines with a slope having a rise or run of unit value (i.e., equal to 1) where the rise and run are both integers, the size of the group 60 will be constant. Examples of these types of families are the Type 2 and Type 5 line families shown in FIGS. 3B, 3C, 3D and 3H.

For a family F of lines with a slope not having a rise or run of unit value where the rise and run are both integers, the size of the group 60 will vary from line to line during the virtual scan line construction process. For example, the Type 3 and Type 6 families of lines shown in FIGS. 3E, 3F, 3I and 3J have varying group sizes from line to line. The number of different group sizes depends upon the rise/run slope. To minimize distortion when a virtual scan line L' is processed, the size of the groups 60 from one raster line 31 to the next line 31 preferably should not differ by more than one pixel.

Some specific examples of the virtual scan line families set forth in FIGS. 3A–3S will now be explained and the twelve family types previously identified described in greater detail. Each family type has repetitive or distinguishing characteristics which can be exploited to implement an efficient algorithm for selecting pixels of interest. Exemplary algorithms for selecting pixels of interest are also discussed below. The algorithms could be implemented as state controllers or counters tailored to the particular rise and run characteristics of a given family of virtual scan lines L'. Other possible implementations for selecting pixels of interest include, but are not limited to, using a line generation algorithm such as Bresenham's line computation algorithm, using the endpoint and slope information, or using a pixel of interest look-up table or look-up table with offsets to the next pixel of interest location.

A "Type 1" family of lines is shown in FIG. 3A. The lines each have a slope=0 (i.e., rise=0, and run=1). All pixels 32 along every $n^{th}$ raster scan line 31 will be pixels of interest in constructing a virtual scan line L'. Therefore, the data from all pixels 32 of every $n^{th}$ raster scan line 31 will be saved.

Figure 3D:
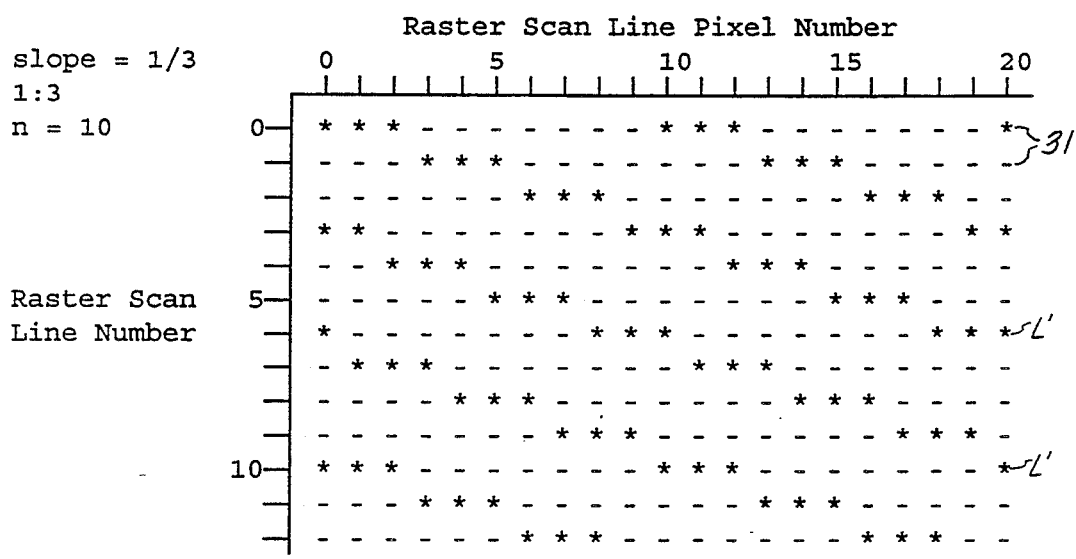

"Type 2" families of lines are shown in FIGS. 3B, 3C and 3D. The lines each have a slope=1/i (i.e., rise=1, integer run>1). The pixel number of the first pixel of interest on the following raster scan line 31 will be the pixel number following the last pixel of interest of the first virtual scan line L' on the current raster scan line 31, unless that number is greater than or equal to n. In that case, a new first virtual scan line L' will start on the next raster scan line 31 with its first pixel of interest number equal to the calculated first pixel of interest number which is greater than or equal to n, minus n. In other words, to obtain the number of the first pixel of interest on the next raster scan line 31, increment the current first pixel of interest number by the number of pixels in the first group 60 of pixels on the current raster scan line 31, modulo n. As can be seen in FIG. 3C, the first pixel of interest of the new virtual scan line L' is not always the first pixel of the raster scan line 31.

A more complex algorithm could be implemented to start a new virtual scan line L' at the first pixel of the raster scan line 31, keeping n constant relative to the virtual scan lines L' in progress. The first group 60 of consecutive pixels in the new virtual scan line will vary in size, as can be seen in FIG. 3D.

Figure 3E:
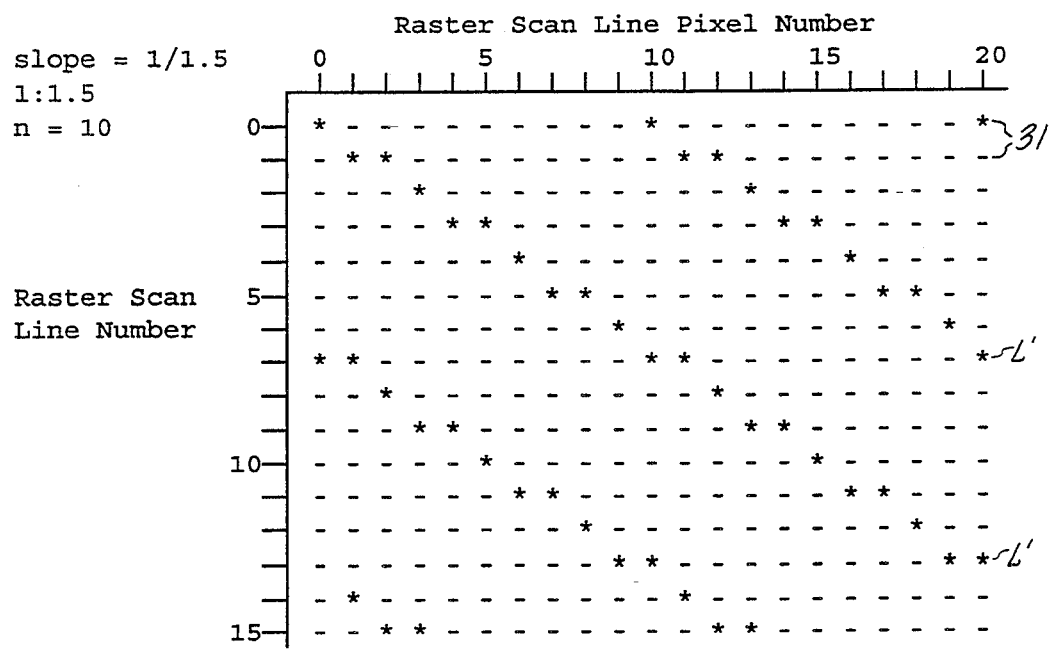
Figure 3F:
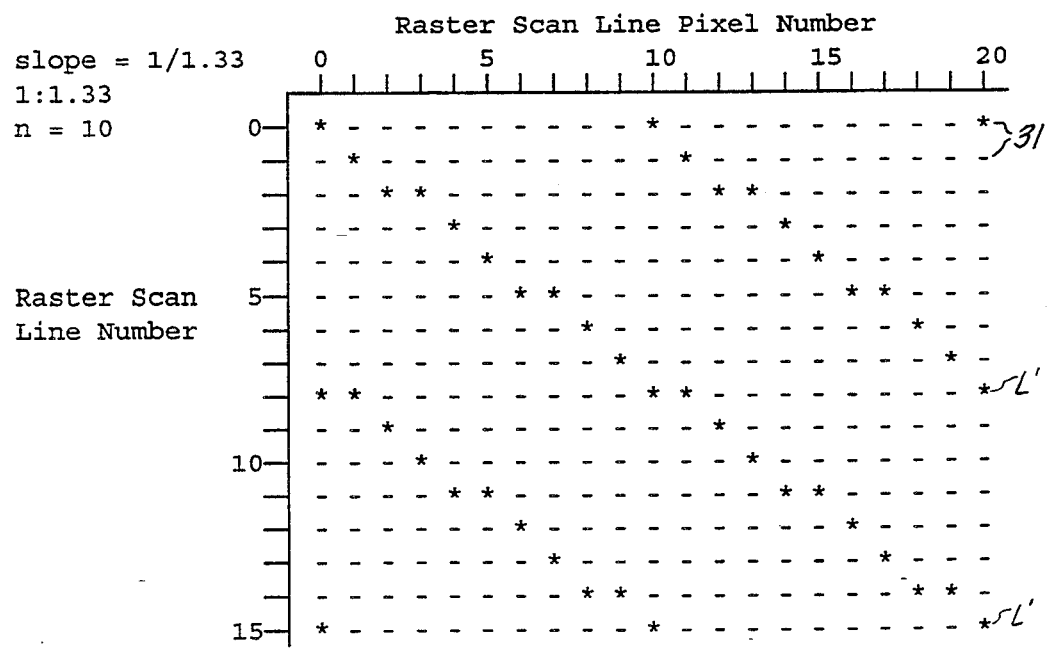

"Type 3" families of lines are shown in FIGS. 3E and 3F. The lines each have a slope =1/x (i.e., rise =1, non-integer run >1). If the non-integer run is an odd multiple of 0.5, then the number of consecutive pixels of interest in the groups on adjacent raster scan lines 31 will alternate between two integer values, as shown in FIG. 3E. Each group 60 starts n pixels apart along each raster scan line 31. If the non-integer run is not an odd multiple of 0.5, then the number of pixels of interest in the groups 60 on adjacent raster scan lines 31 will repeat in a pattern of more than two integer values, as shown in FIG. 3F. Once it is determined where to start capturing a particular group 60 of pixels from the start of the raster line 31, following groups 60 of pixels may be captured starting n pixels apart. The location of the first pixel of interest on the next raster scan line 31 is determined in a similar manner as with the Type 2 virtual scan line family described above.

Figure 3G:
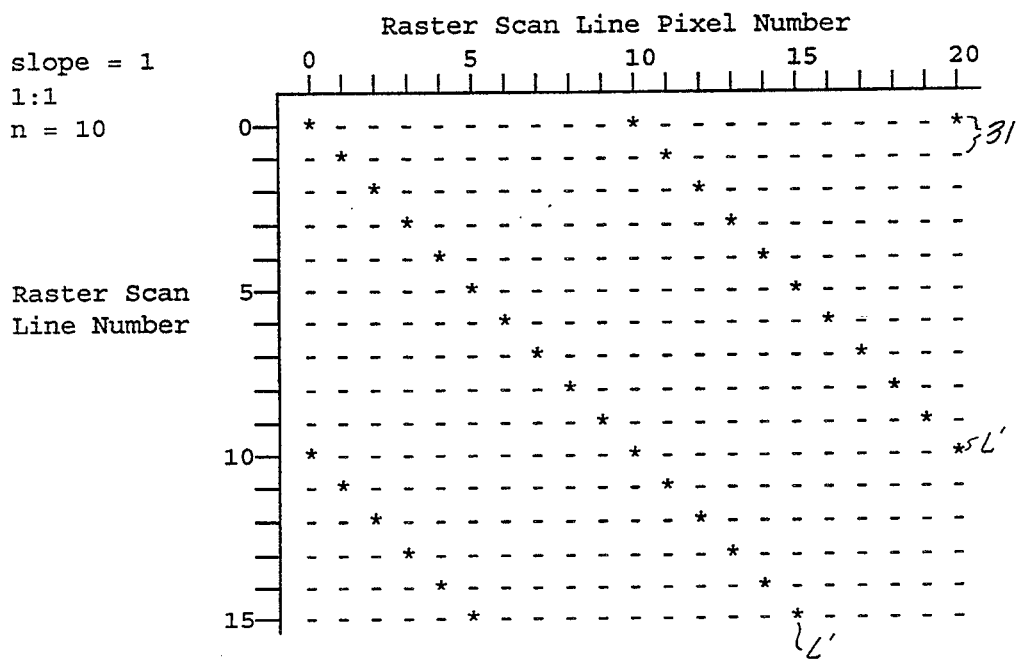
Figure 3H:
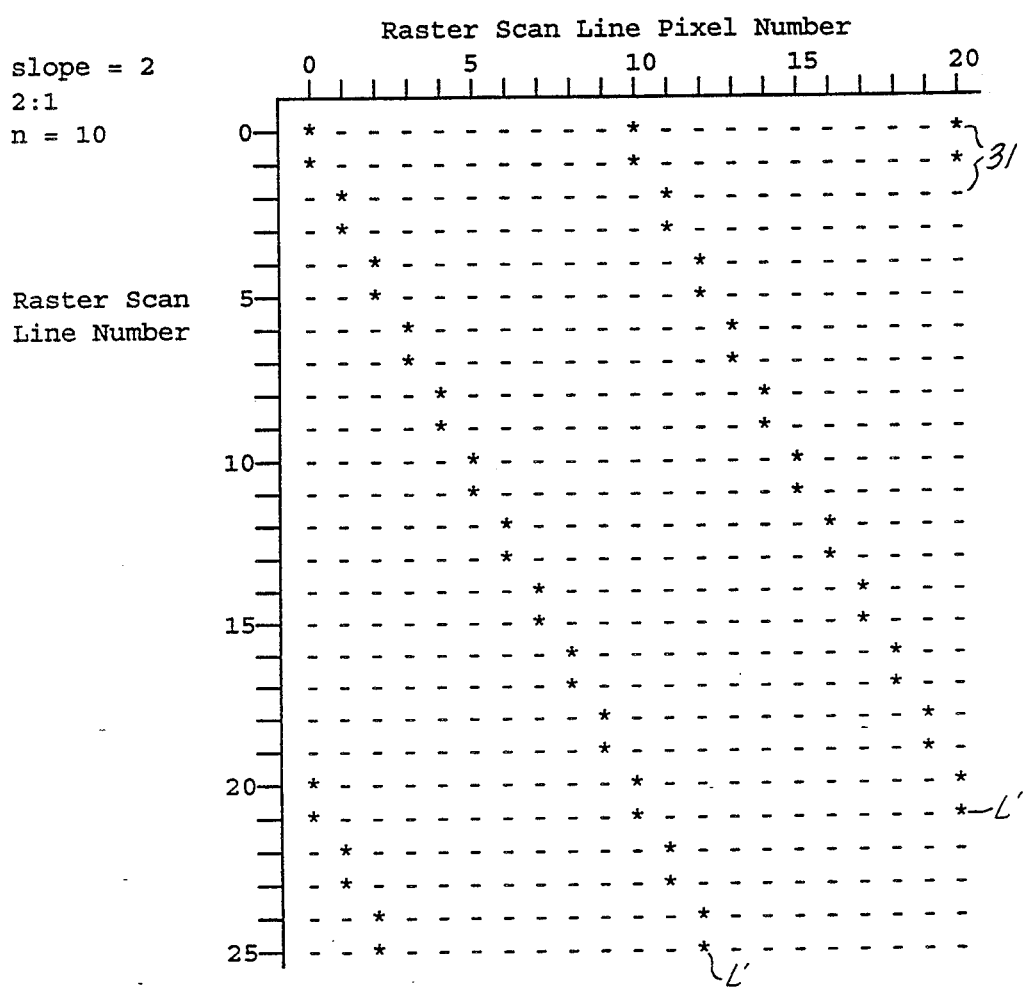

A "Type 4" family of lines is shown in FIG. 3G. The lines each have a slope =1 (i.e., rise =1, run =1). The location of the first pixel of interest on the next raster scan line 31 is also determined as described above for the Type 2 virtual scan line family. For a type 4 family, a new virtual scan line L' will be started with its first pixel of interest always being the first pixel of the next raster scan line 31.

A "Type 5" family of lines is shown in FIG. 3H. The lines each have a slope =i (i.e., integer rise >1, run =1). The location of the first pixel of interest on the next raster scan line 31 will not increment until a number of pixels 32 equal to the rise have been stored from consecutive raster scan lines 31. Upon storing the rise number of pixels 32, the first pixel of interest on the next raster scan line 31 will again be determined as described for the Type 2 virtual scan line family. A new virtual scan line L' will be started with its first pixel of interest always being the first pixel of the next raster scan line 31.

Figure 3I:
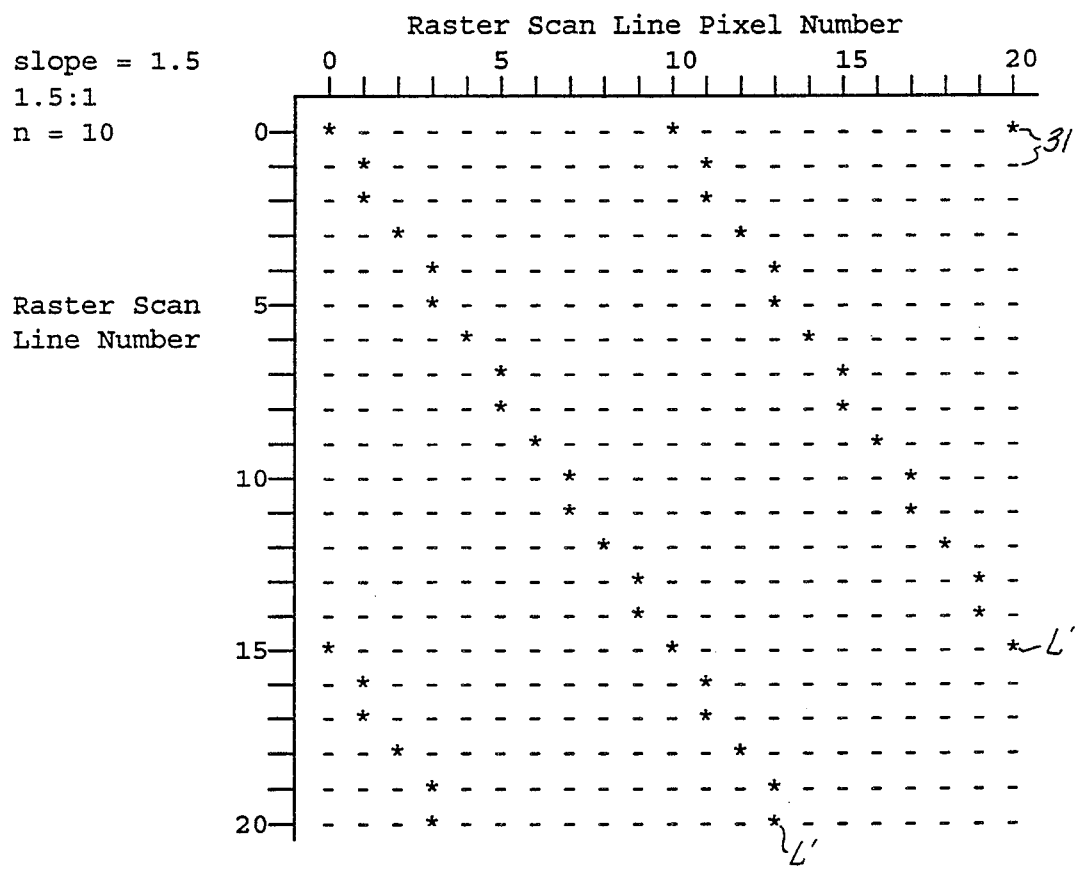
Figure 3J:
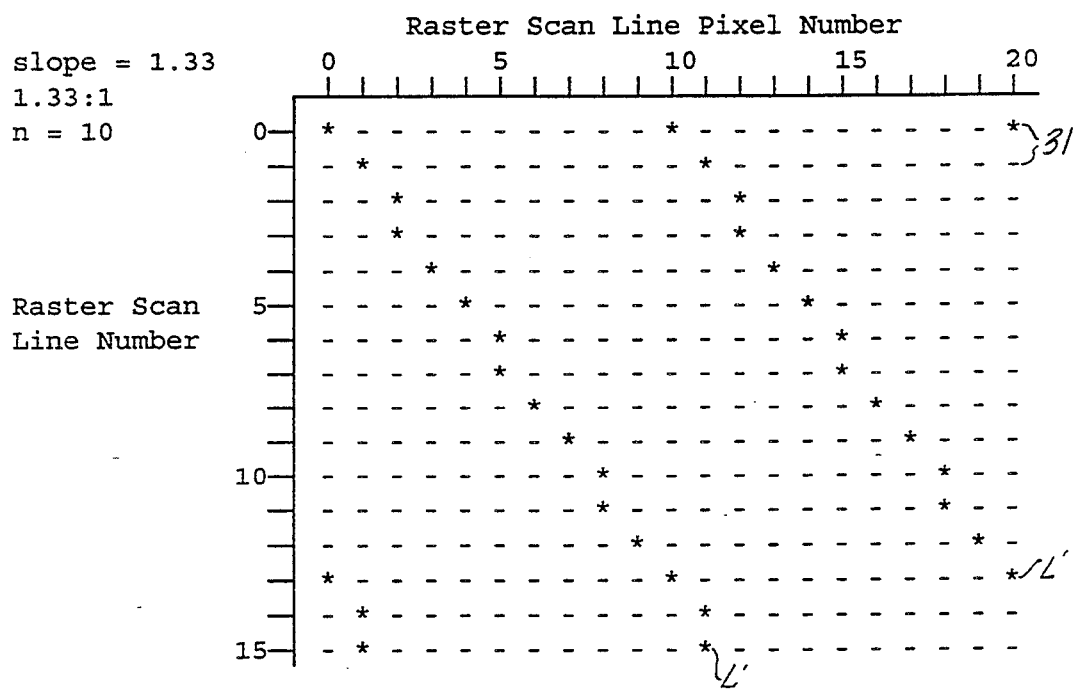

"Type 6" families of lines are shown in FIGS. 3I and 3J. The lines each have a slope =x (i.e., non-integer rise >1, run =1). If the non-integer rise is an odd multiple of 0.5, then the number of pixels 32 that must be stored before incrementing to the next location of the following raster line 31 will alternate between two integer values. If, on the other hand, the non-integer run is not an odd multiple of 0.5, then the number of pixels 32 that must be stored before incrementing to the next location of the following raster line 31 will repeat in a pattern of more than two integer values. The location of the first pixel of interest on the next raster scan line 31 is again determined as described above for the Type 2 virtual scan line family.

Figure 3K:
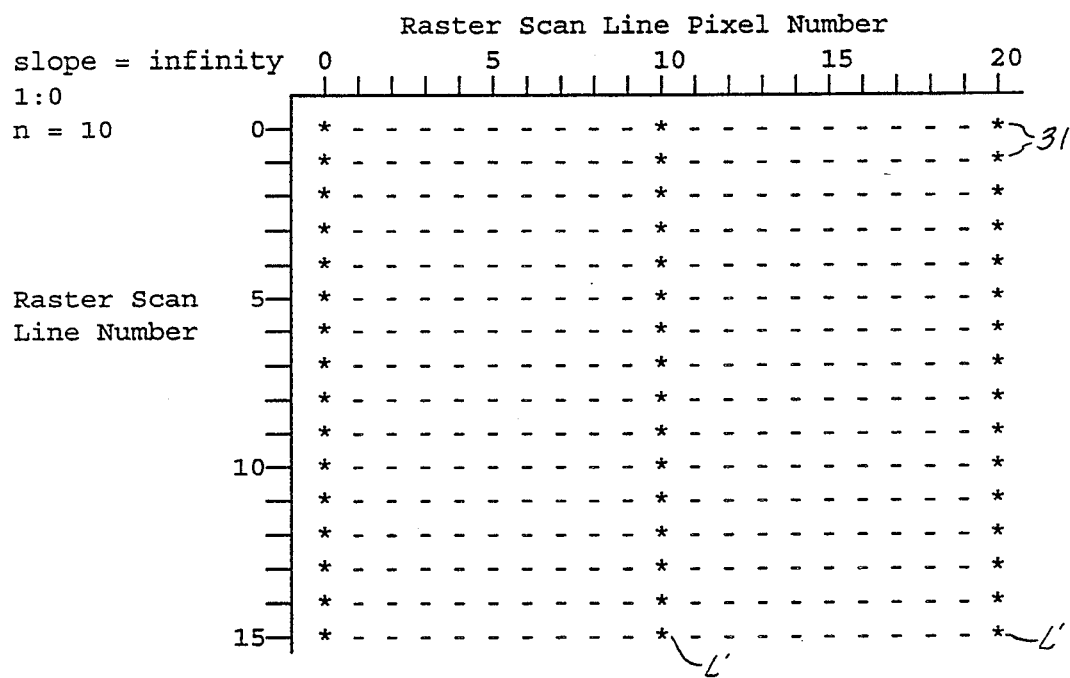

A "Type 7" family of lines is shown in FIG. 3K. The lines each have a slope =infinity (i.e., rise =1, run =0). For a type 7 family of lines, starting with the first pixel of on each raster scan line 31, every $n^{th}$ pixel is to be captured.

Figure 3L:
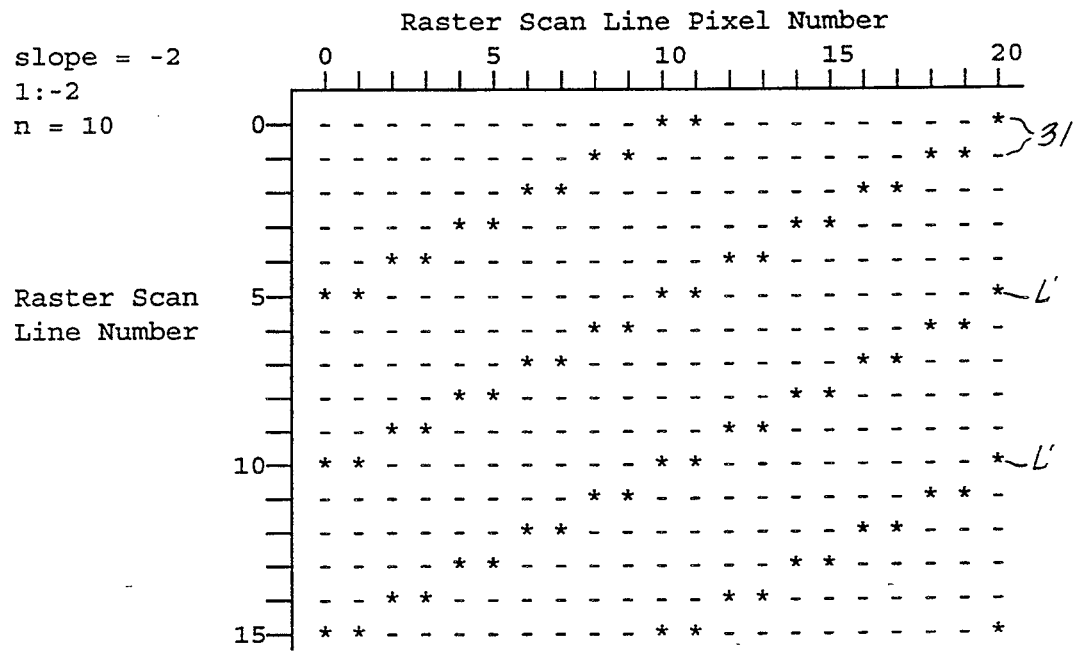
Figure 3M:
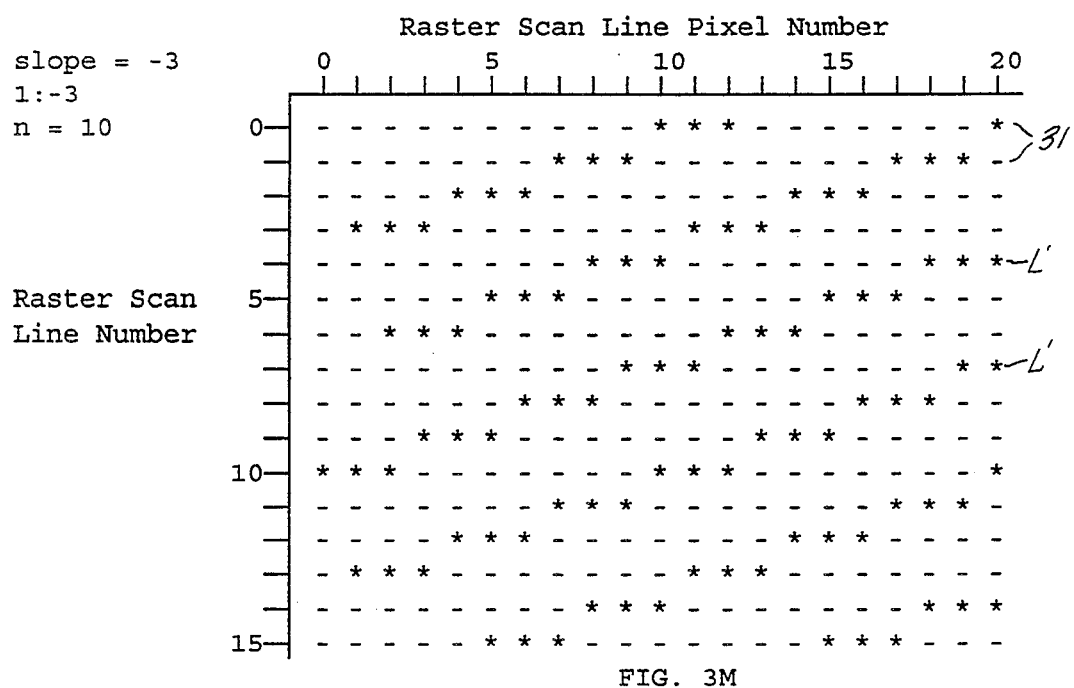

"Type 8" families of lines are shown in FIGS. 3L and 3M. The lines each have a slope =1/−i (i.e., rise =1, integer run <1). The pixel number of the first pixel of interest on the next raster scan line 31 will be the pixel number preceding, by the number of pixels in the first group 60 of pixels on the next raster scan line 31, the first pixel of interest number of the first virtual scan line L' of the current raster scan line 31, unless that number is less than zero. In that case, the first pixel of interest number on the next raster scan line 31 will be the calculated first pixel of interest number (which is less than zero), plus n. In other words, to obtain the number of the first pixel of interest on the next raster scan line 31, decrement the current first pixel of interest number by the number of pixels 32 in the first group 60 of pixels on the next raster scan line 31, modulo n. As can be seen in FIG. 3M, the first pixel of interest of the new virtual scan line is not necessarily the first pixel of the raster scan line 31.

As described above with reference to the Type 2 family of virtual scan lines, a more complex algorithm could be defined such that new virtual scan lines L' are always begun with the first pixel of the raster scan line 31. For type 8 families of lines, it should be noted that the sequence of pixels 32 within each group 60 along successive raster scan lines 31 should be reversed for the sequential construction of the virtual scan lines L'. One possible way to accomplish this may be to store the pixels 32 within the groups 60 in a last-in-first-out arrangement. Another solution may be to buffer each raster scan line 31, then process the sequence of pixels 32 for that raster scan line 31 in reverse order using the forward virtual scan line construction algorithms explained for Type 2 through Type 6 line families.

Figure 3N:
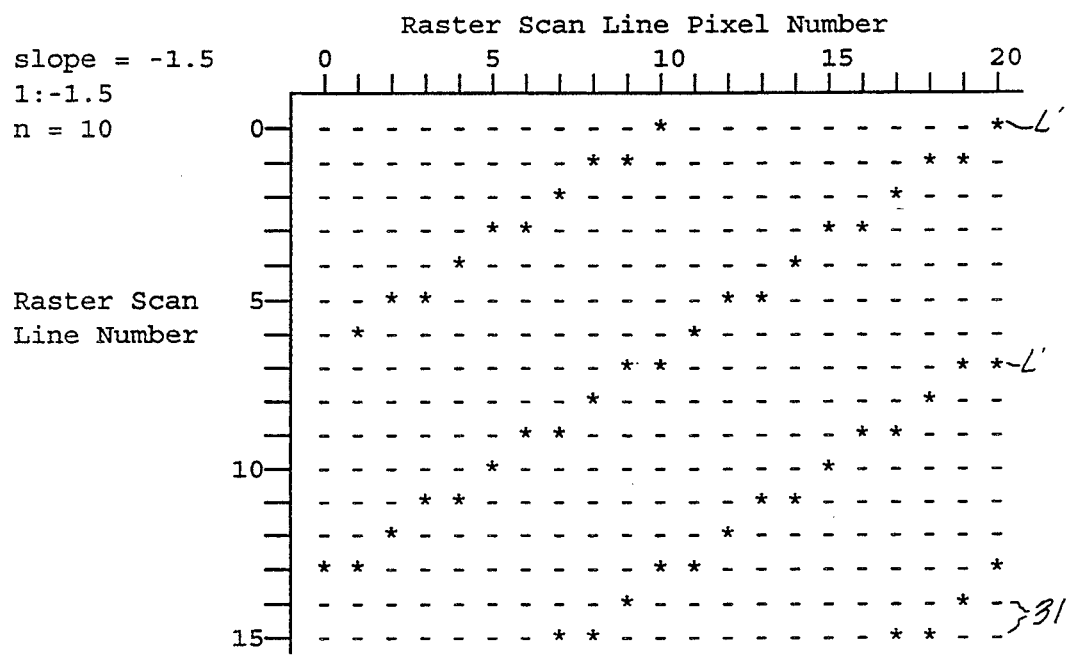
Figure 3O:
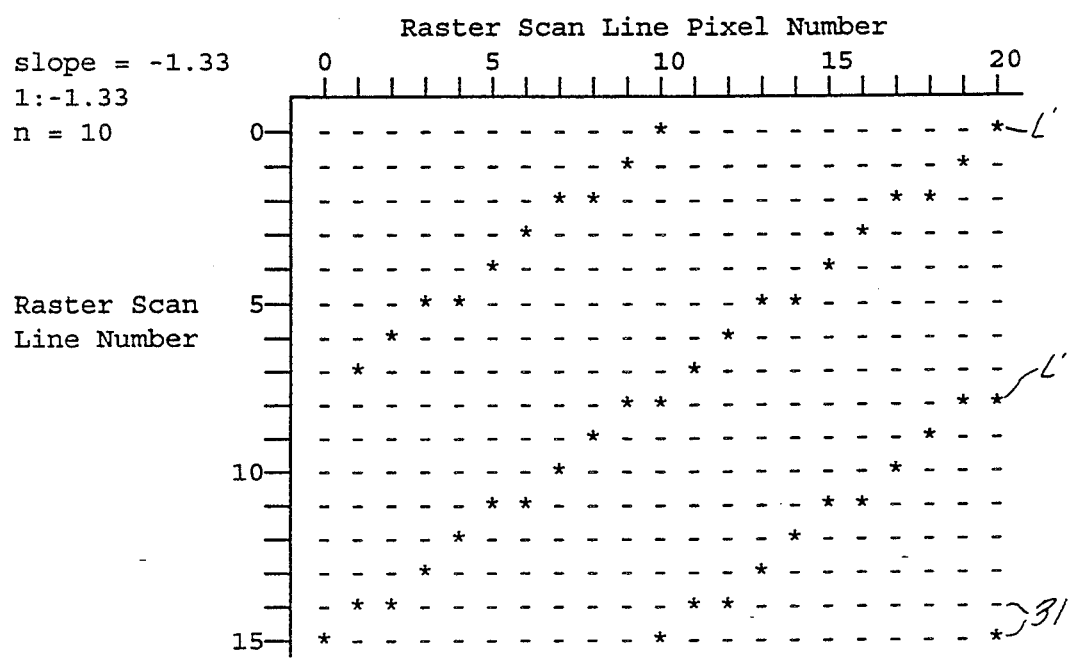

"Type 9" families of lines are shown in FIGS. 3N and 3O. The lines each have a slope $=1/-x$ (i.e., rise $=1$, non-integer run $<1$). If the non-integer run is an odd multiple of $-0.5$, then the number of consecutive pixels of interest in the groups 60 on adjacent raster scan lines 31 will alternate between two integer values, as shown in FIG. 3N. If, on the other hand, the non-integer run is not an odd multiple of $-0.5$, then the number of pixels 32 of interest in the groups 60 on adjacent raster scan lines 31 will repeat in a pattern of more than two integer values, as shown in FIG. 3O. The location of the first pixel of interest on the next raster scan line 31 is determined as described above for the Type 8 virtual scan line family. As can be seen in FIGS. 3N and 3O, the first pixel of interest of the new virtual scan line L' may not necessarily be the first pixel of the raster scan line 31.

Figure 3P:
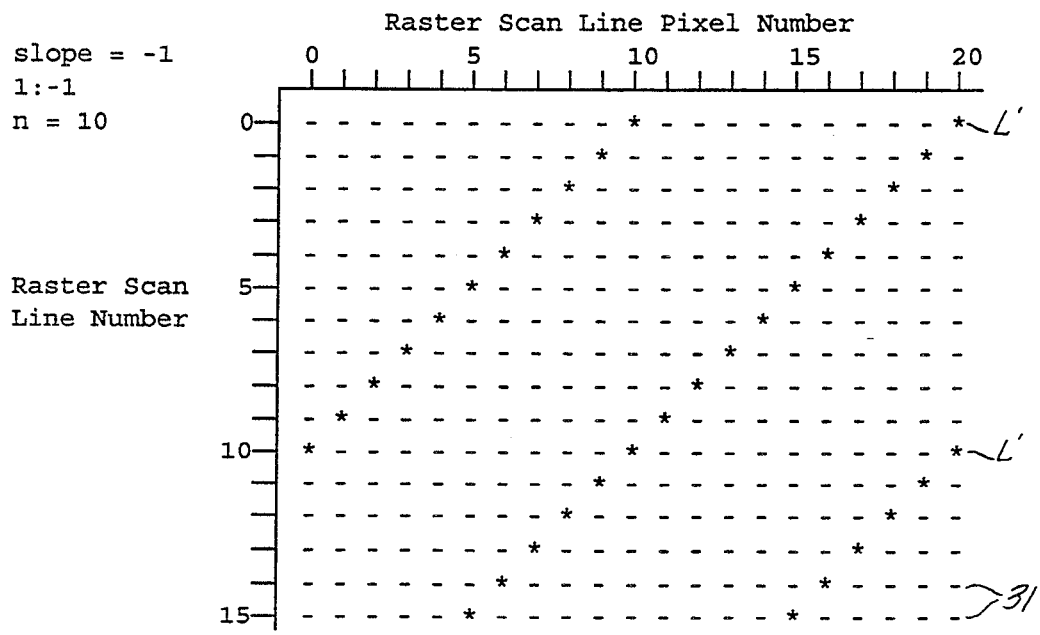

A "Type 10" family of lines is shown in FIG. 3P. The lines each have a slope $=-1$ (i.e., rise $=1$, run $=-1$). The location of the first pixel of interest on the next raster scan 31 line is determined as described above for the Type 8 family of virtual scan lines. For a type 10 family, a new virtual scan line L' will be started with its first pixel of interest always being the first pixel of the next raster scan line 31.

Figure 3Q:
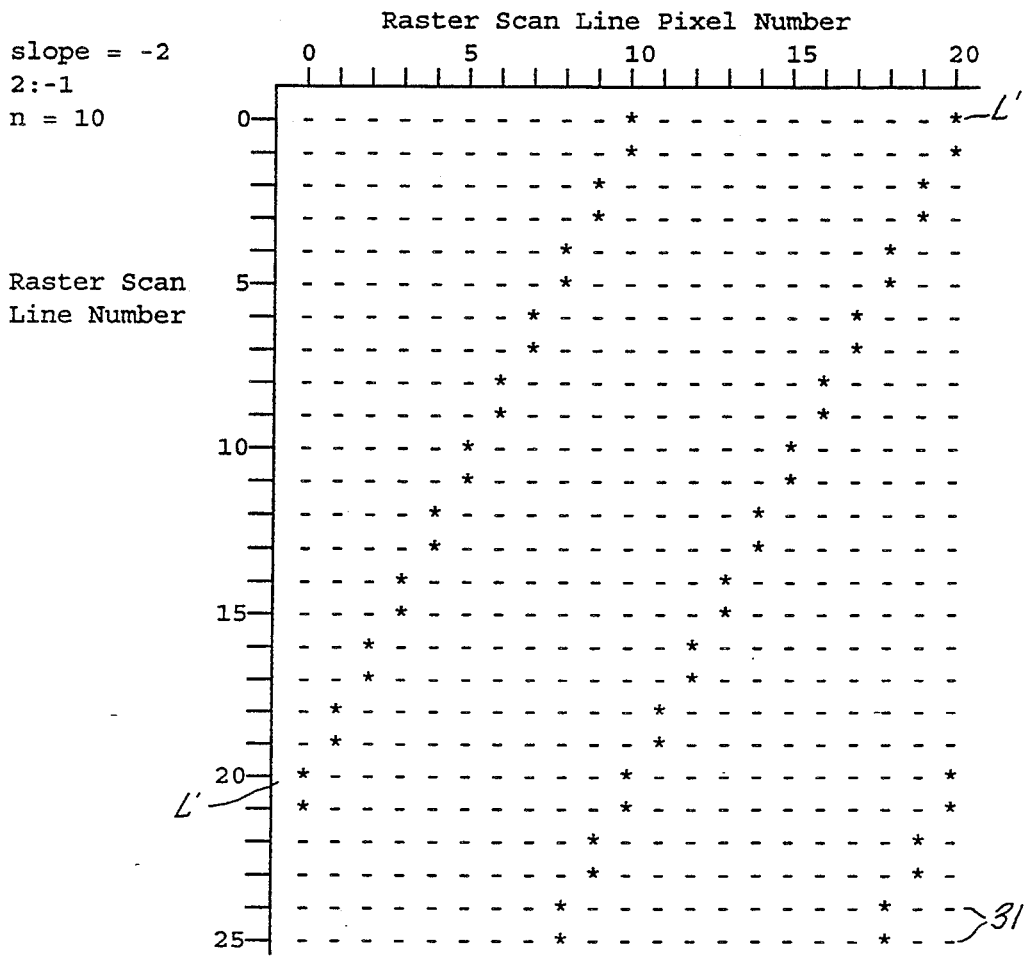

A "Type 11" family of lines is shown in FIG. 3Q. Each line has a slope $=-i$ (i.e., integer rise $>1$, run $=-1$). The location of the first pixel of interest on the next raster scan line 31 will not decrement until a number of pixels 32 equal to the rise have been stored from consecutive raster scan lines 31. Upon storing the rise number of pixels 32, the first pixel of interest on the next raster scan line 31 will be determined as described above for the Type 8 virtual scan line family. For the type 11 family, a new virtual scan line L' will be started with its first pixel of interest always being the first pixel of the next raster scan line 31.

Figure 3R:
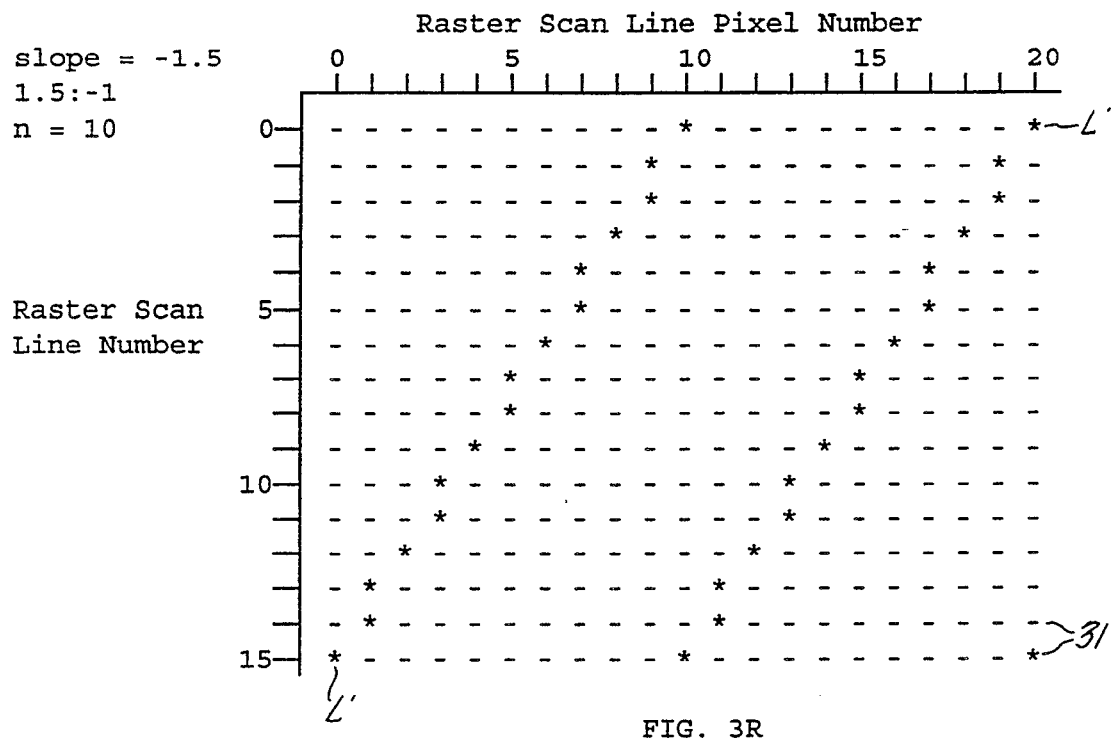
Figure 3S:
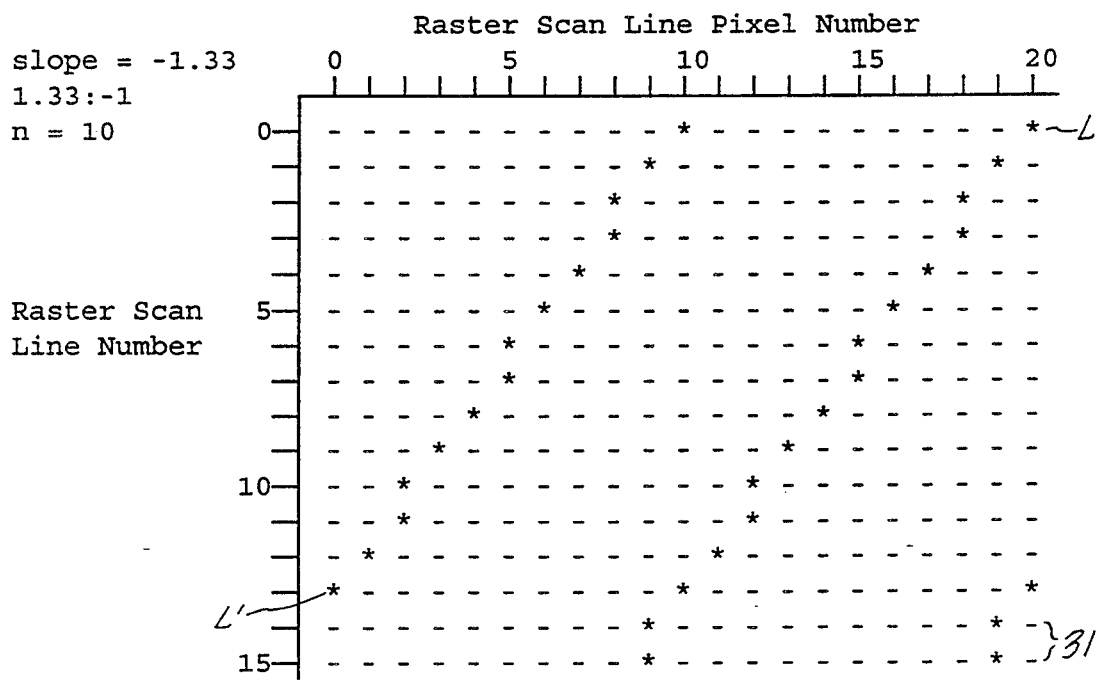

"Type 12" families of lines are shown in FIGS. 3R and 3S. The lines each have a slope $=-x$ (i.e., non-integer rise $>1$, run $=-1$). If the non-integer rise is an odd multiple of $-0.5$, then the number of pixels 32 to be stored before decrementing to the next location of the following raster line will alternate between two integer values, as shown in FIG. 3r. If, on the other hand, the non-integer run is not an odd multiple of $-0.5$, then the number of pixels 32 to be stored before decrementing to the next location of the following raster line 31 will repeat in a pattern of more than two integer values, as shown in FIG. 3S. The location of the first pixel of interest on the next raster scan line 31 is determined as described above for the Type 8 virtual scan line family. For a type 12 family, a new virtual scan line L' will be started with its first pixel of interest always being the first pixel of the next raster scan line 31.

As previously noted, the categorization of virtual scan lines L' into family types is of assistance in defining suitable algorithms to expedite the pixel of interest selection process. The pixel of interest selector 100, which makes the initial determination whether a given pixel is of interest, could simply be a combinatorial logic block having as its inputs the two-dimensional raster coordinates of the pixel, and its outputs the line number or numbers to which the pixel belongs. For an imaging region 13 of 1024 by 1024 pixels in size, the x and y coordinates of a given pixel 32 would each be 10 bits wide, requiring a combinatorial logic block having a function of 20 inputs. Although such a combinatorial logic block is possible to implement, it would likely be unacceptably large; thus, a more efficient selection method is desirable.

Figure 6A:
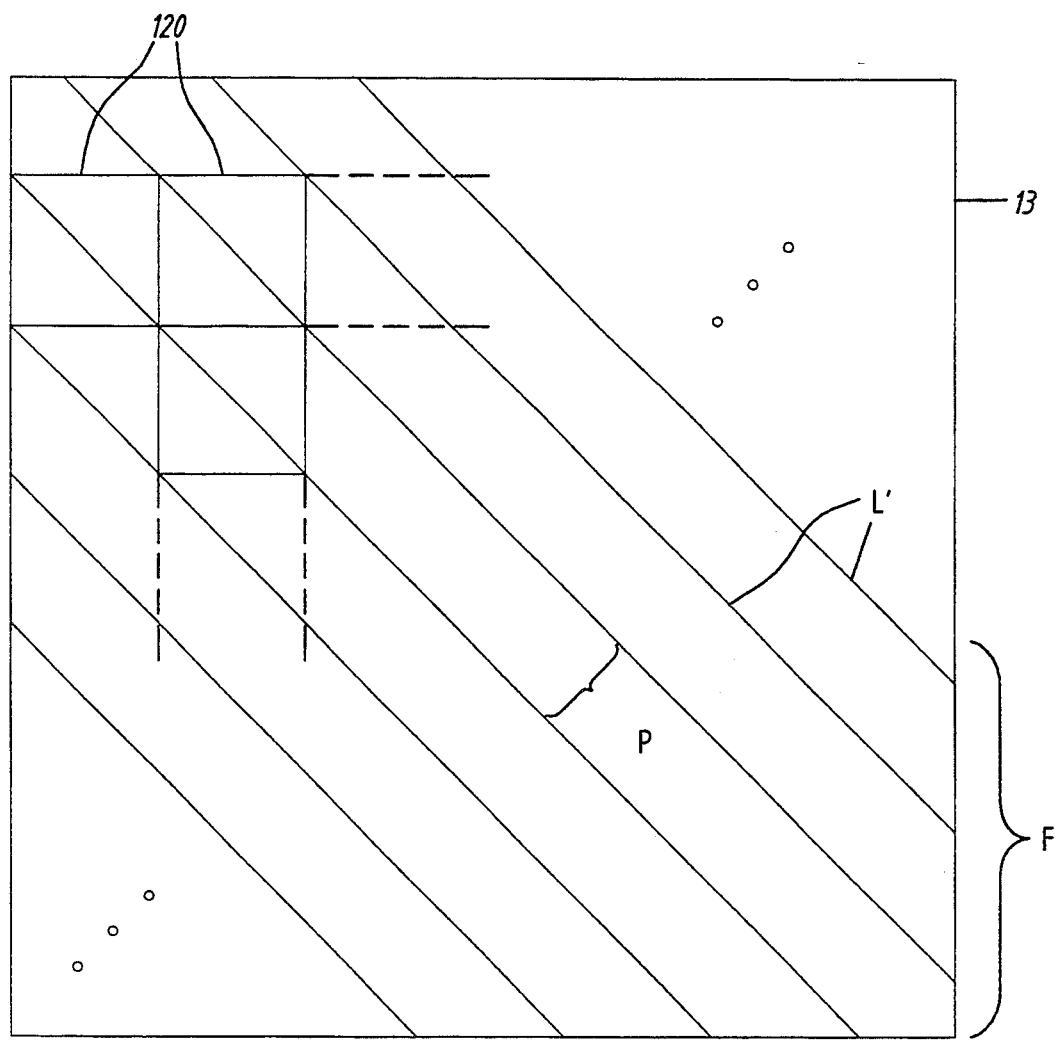
FIG. 6A is a diagram of an imaging region broken into subregions or tiles.

The preferred method is therefore to divide or segment the imaging region 13 into identical subregions or rectangular "tiles". An example of this segmentation is shown in FIG. 6A. The size of each tile 120 is defined by the spacing and slope of the virtual scan lines L'. The size of the tiles 120 will therefore differ for each family of lines depending on the angle with respect to the imaging region 13. The reason it is possible to divide the imaging region 13 in such a way is because of the repetitive pattern of the virtual scan lines L'. For a given family F of virtual scan lines L' the lines all have the same angle with respect to the imaging region 13 and are separated from adjacent parallel lines by the same distance (the pitch P described earlier). Thus, for a given family F, it is possible to divide the imaging region 13 into a number of identical rectangular tiles 120, each of which contains an identical pattern, each of which is defined in part by the pitch P and the angle with respect to the imaging region 13, and each of which is crossed diagonally (or otherwise, for vertical or horizontal virtual scan lines) by a portion of a virtual scan line L'.

The advantage of subdividing the imaging region 13 into tiles is that, within each tile 120, it is possible to select pixels of interest according to a simpler logic function than would otherwise be necessary without such segmentation. For example, if each tile 120 for a particular family F of lines is 32 by 64 pixels in size, then the number of inputs to the logic function needed to select the pixels of interest would be only $5+6=11$. Because the complexity of combinatorial logic increases geometrically with the number of inputs, a function of 11 inputs is far easier to analyze and implement than a function of, for example, 20 inputs or more as may be required without segmentation.

Figures 6B, 6C:
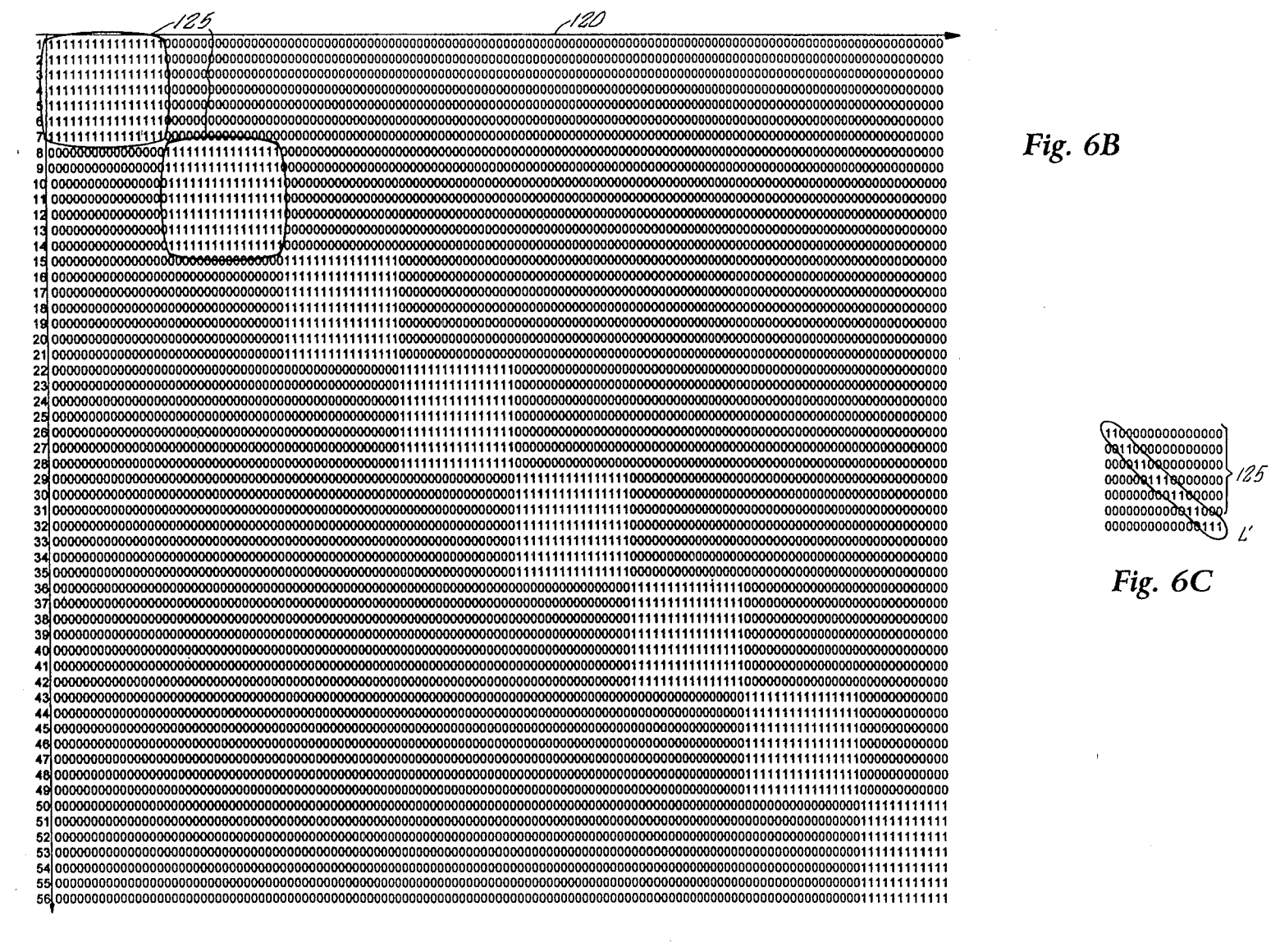

As mentioned above, the length and width of each tile 120 is defined by the location of the adjacent parallel virtual scan lines L'. Once the imaging region 13 has been divided into a number of tiles 120, however, it is also possible to subdivide the tiles 120 into even smaller subtiles 125, as shown in FIG. 6B, to achieve greater efficiency. This further subdivision is possible again because of the repetitive nature of the virtual scan lines L' within each tile 120. FIG. 6B shows a tile 120 subdivided into smaller subtiles 125. The subtiles 125 through which a virtual scan line L' passes are subtiles of interest, and each has the same pattern of pixels of interest. A subtile 125 of interest is denoted by a block of pixels represented by "1" symbols, while other pixels are denoted by "0" symbols. FIG. 6C shows an example of pixels of a virtual scan line L' traversing the diagonal of a subtile 125. The pixels of interest within a given subtile 125 could be selected by combinatorial logic that would be identical for each subtile 125. Thus, only one combinatorial logic block is needed for all subtiles 125 of a given family of lines.

Figure 6D:
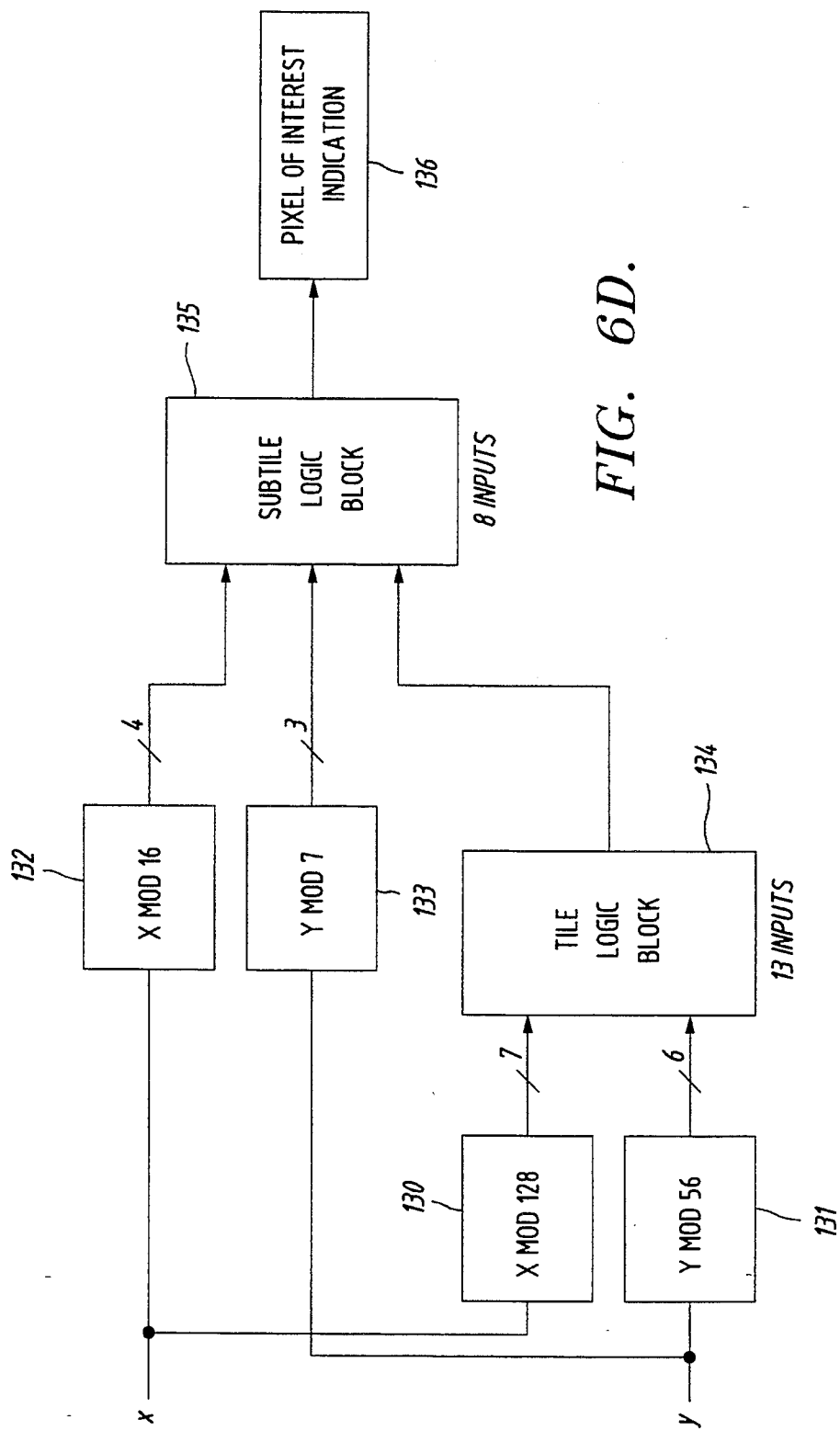
FIG. 6D is diagram showing an implementation of a pixel of interest selector in accordance with FIGS. 6A-6C.

FIG. 6D shows an implementation of part of a pixel of interest selector 100 that would select pixels of interest for a particular tile 120. For a given family F of virtual scan lines, each tile 120 is identical—that is, each tile is defined such that the pattern of pixels of interest within any particular tile 120 is the same as all the other tiles 120 for that family F. The dimensions of a tile 120 depend upon the line spacing P and the slope of the family F of lines relative to the horizontal of the imaging area 13. The two-dimensional coordinates x and y of the current pixel being read are provided to two modulo adders 130 and 131 which yield adjusted coordinates x' and y'. In the present example, a modulo-128 adder and modulo-56 adder are shown. Thus, each tile will be 128 pixels wide by 56 pixels high. The adjusted coordinates x' and y' are provided to a tile logic block 134 which is tailored to the specific pattern of subtiles 125 within the tile 120. The tile logic block 134 provides an output indicating that the pixel either is or is not a member of the family of subtiles 125.

The output of the tile logic is provided to a subtile logic block 135. The two-dimensional coordinates x and y are provided to two other modulo adders 132 and 133 which, in a manner similar to that described above, divide the imaging region 13 into identical subtiles. In the present example shown in FIG. 6D, the subtiles are 16 pixels wide by 7 pixels high. The modulo adders 132 and 133 provide adjusted coordinates x" and y" to the subtile logic block 135. When the tile logic block 134 indicates that the current pixel is within a subtile 125 of interest, the subtile logic block indicates, based on the adjusted coordinates x" and y", whether the current pixel is a pixel of interest. For cases where the desired modulus is an integral power of two, the modulo-adders may be implemented simply by taking the least significant bits of the actual x or y coordinates. (In the attached Microfiche Appendix, the program "proto2.cpp" implements the previously described algorithms for pixel of interest selection, the file "poi.cpp" includes functions essentially performing the function of the modulo counters, the file "tilefunc.cpp" includes functions essentially simulating the pixel of interest selection within particular tiles, and the files "poi h" "fifo h" "video h" and "pcvision h" provide related supporting functions).

Although the tiles 120 in FIG. 6A are shown traversing the diagonal of the imaging region 13, it is also possible that the tiles 120 could traverse the imaging region 13 in other ways, so long as the tiles 120 line up when placed together. The same is true of subtiles 125 traversing the regions of the tiles 120. It should also be noted that segmentation into tiles may not be necessary for virtual scan lines which are vertical or horizontal, as the pixel of interest selection logic is relatively simple for those cases of virtual scan lines.

Once the pixels of interest have been identified by the pixel of interest selector 100, the selected pixel data is provided to a pixel of interest buffer 101 along with information identifying the family F and the particular virtual scan line L' within that family F which the pixel is associated with. Such information may include the number of new virtual scan lines L' begun so far for the family F and the number of virtual scan lines L' begun so far on the particular scan line 31. The pixel of interest buffer 101 provides this information to the pixel of interest sorter 102 which stores the pixel data in the appropriate virtual scan line buffer 103. The pixel of interest sorter 102 stores the pixel data serially for each separate virtual scan line L'. Thus, each virtual scan line L' will be stored as if scanned from left to right and from top to bottom (in accordance with the progression of the raster scanned input).

Figure 6E:
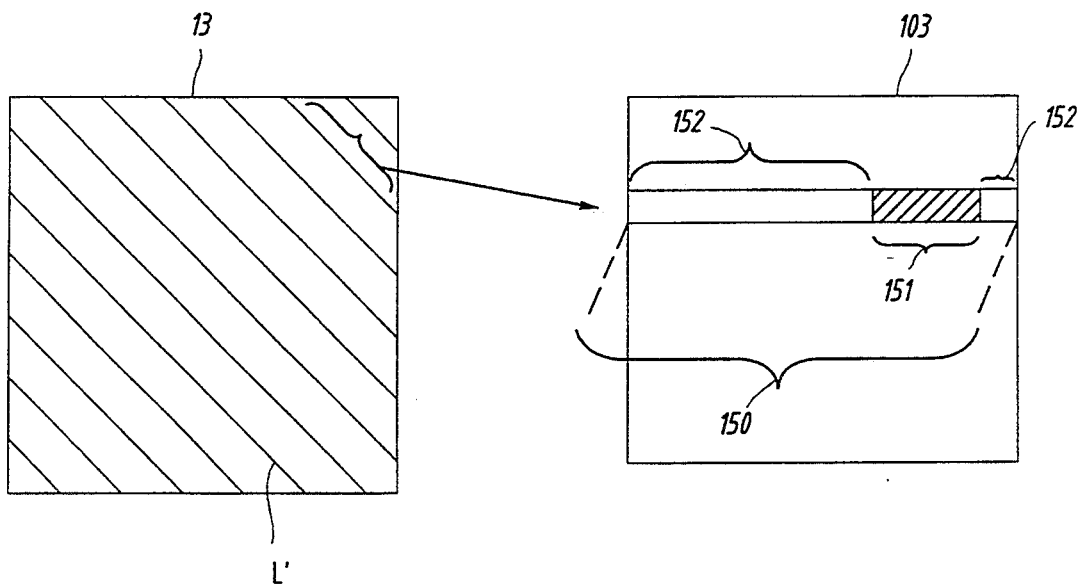
FIG. 6E is a diagram showing the storage of virtual scan line data in memory.

Various methods may be used to achieve storage and processing efficiency. (Attached hereto in a Microfiche Appendix is a copy of source code for a program entitled "storectl.cpp" written in the computer language "C". This program simulates storage control operations of selected pixel of interest data and keeps track of starting and ending addresses of virtual scan lines). A separate portion of memory may be allocated for each family F. Counters may be used to keep track for each virtual scan line of where the last data was stored for a particular line. However, the number of counters may be excessive and the required processing lengthy. An alternative method is to use the x and y raster address to arrive at a unique index for storing pixel data for a given virtual scan line L'. This method is described with reference to FIG. 6E. An array 150 of memory space (e.g., virtual scan line buffers 103) is allocated for each virtual scan line L' For some virtual scan lines L' only a relatively small portion of the array 150 will be used. But because the x and y address of the raster scan provide a unique address to the array 150, no additional hardware is needed to determine where in the array 150 to store the pixel data 151 for the particular virtual scan line L'. In general, it is a better tradeoff to have unused memory space than to require lengthy additional processing to optimize storage algorithms because memory is less expensive than high speed processing. Further, if the starting and ending address of the virtual scan line L' are known, then the system can save processing time by avoiding the processing of unused memory areas 152 and simply processing the portion of the memory array 150 containing pixel data 151.

It should be noted that it is also possible to identify the virtual scan line L' after the pixel data is stored in a pixel of interest buffer 101. If fast hardware is used such that no buffer is necessary, the pixel of interest selector could store the pixels of interest directly in the virtual scan line buffers 103.

After the selected pixels have been stored in the virtual scan line buffers 103, the stored scan line information 105 is provided by a virtual scan line retrieval block 104 to an edge detection and decoding block 3 (as depicted in FIG. 1A). Because the pixel information is stored as linear data, conventional one-dimensional signal processing methods, either analog or digital, for edge detection and decoding may be used (see, e.g., U.S. Pat. No. 4,000,397). The performance of the signal processing and edge detection portion of the system determines the density of data samples; needed along the scan lines in order to accurately resolve the bar code element edge locations. Since only selected pixels from the sensor are processed, the data rate into the signal processing section is reduced, allowing the use of more sophisticated signal processing methods.

After the element widths have been measured, the widths of bars and spaces crossed by the virtual line are determined and decoding can be done by methods known in the art (e.g., see U.S. Pat. No. 4,879,456). Since the number of pixels stored may vary among the various virtual scan lines, it may be advantageous to have the decoder use the knowledge of scan line boundaries within the data stream. For example, if the start and end points of the bar code image are stored for a particular virtual scan line, then decoding need only be done between the start and endpoints of the bar code image so that the decoder does not waste time attempting to decode empty memory space.

Figure 7:
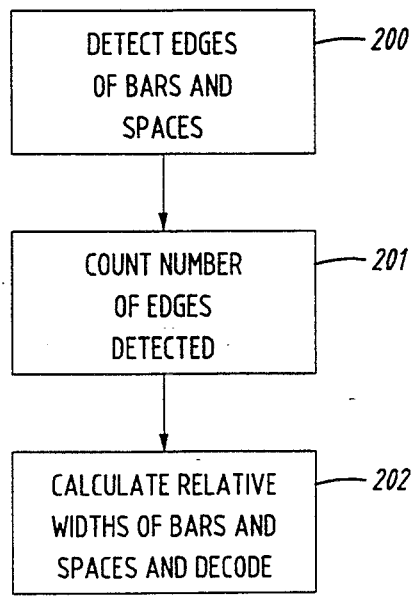
FIG. 7 is a functional block diagram showing the basic steps necessary for decoding.

Decoding may also be expedited by prescreening of data to be decoded. Referring to FIG. 7 which shows an abstract block diagram of a decoding process, the process of decoding may be broken up into a first step 200 of determining the edges of the bars and spaces, a second step 201 of counting the edges of the bar code image, and a third step 202 of decoding to obtain the relative widths of the bars and spaces, testing the ratios to verify a valid bar code, and performing other functions to determine the information contained in the bar code. The third step 202 may take a significant amount of processing time. It is possible to eliminate the third step 202 for scan lines which do not provide sufficient data to be useful. For example, if the edges counted in the second step 201 will not provide enough bars and spaces for a minimum decodable piece, then the data for that scan line may be discarded and the third step 202 of decoding eliminated for that particular scan line. Also, the decoder may treat the data as a set of distinct virtual scan lines, rather than a continuous stream of bars and spaces, to reduce the chance of erroneous stitching or otherwise combining the ends of two different line sweeps which do not belong together.

Alternate Embodiments

Figure 8A:
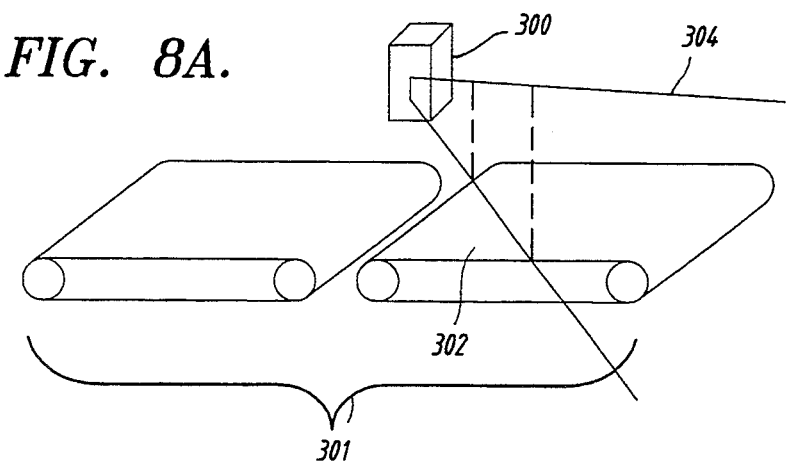
FIGS. 8A-8D are diagrams showing different views of a single line scanner mounted adjacent to a conveyor belt.
Figure 8B:
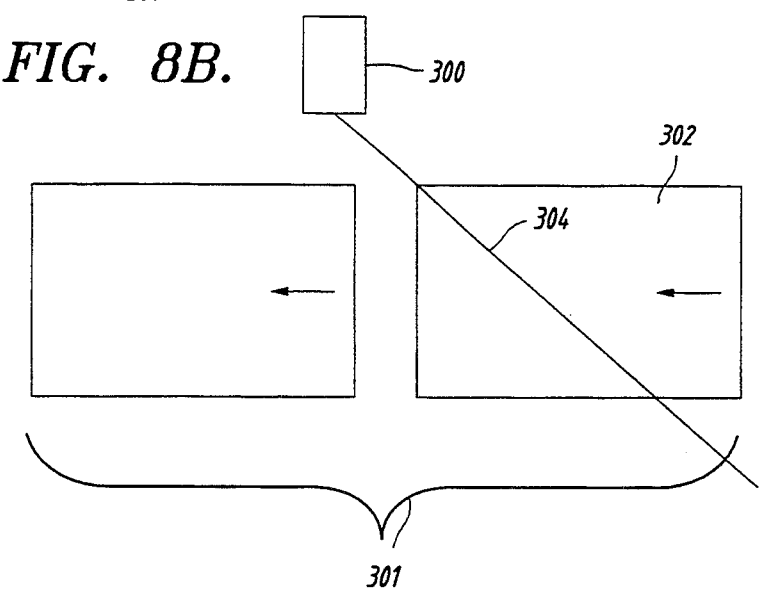
Figure 8C:
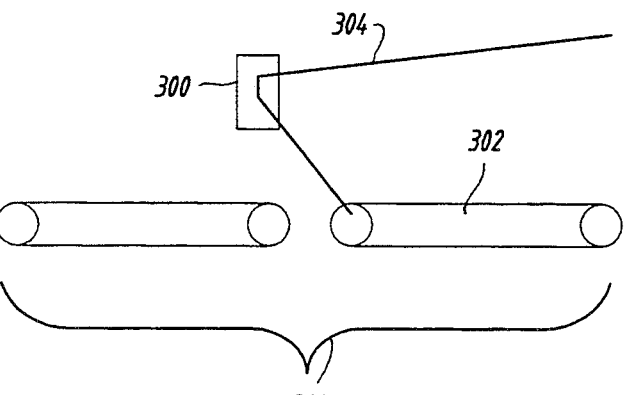
Figure 8D:
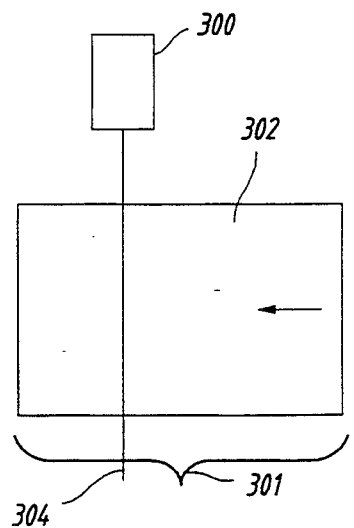

The optical sensor 12 shown in FIG. 1B may be an area sensor (such as a video camera or CCD chip) or, as shown in FIGS. 8A-8D, a single line scanner 300 (such as a single line CCD or a single line laser scanner) moved relative to the object being scanned either by moving the object on a conveyor 301, by moving the scanner 300, or by deflecting the position of the line imaged by the single line scanner 300. As art object being scanned moves across the field of view 304 of the scanner 300, the scanner 300 periodically scans the object in a linear fashion. The repeated linear scans as the object moves provide the second dimension of the scan area input. The linear scan may be angled at a diagonal to the product movement, as shown in FIG. 8B, or may be perpendicular to the product movement, as shown in FIG. 8D. Because of the small size of CCD arrays, the optical sensor 12 may be quite small compared to a conventional laser scanner using mirrors or holographic beam deflecting elements. Further, a large field of view is possible, particularly with a one-dimensional array scanning across the entire width of a conveyor belt, without substantially increasing the complexity of the system. Thus, some embodiments of the present invention could have a field of view several feet square. In contrast, conventional systems using holographic elements or mirrors require a relatively small field of view (e.g., a few inches square) in order to keep the number of mirrors reasonable.

It is possible to combine the optical sensing devices and some or all of the signal processing hardware onto the same integrated circuit device. Such a combination has advantages in increasing speed, reducing size and cost, and increasing reliability. Examples of this type of integration may be found in the I-1000 analog VLSI chip manufactured by Synaptics of San Jose, Calif., and the VLSI machine vision sensor chip manufactured by VLSI Vision Ltd. of Edinburgh, Scotland. System implementations can be designed using low power, compact devices which are suitable for attaching to a substrate (such as a printed circuit board or a ceramic or plastic substrate) for a low cost, reliable, small system. It is also possible to combine in a single integrated circuit device the imaging functions and signal processing functions which would provide linear data collected along virtual scan lines to a element width detector or a decoder. A microprocessor or microcontroller may be included in the system to control various aspects of pixel of interest selection, storage or other processing.

Various alternate embodiments are directed towards the form of information communicated between the image acquisition block 1 and the virtual scan line generator block 2 discussed previously with respect to FIG. 1. Instead of using light intensity data, it is also possible (using additional operations and state information in the pixel of interest sorter 102 shown in FIG. 5) to store data processed to a higher level in the virtual scan line buffer 103. For example, the data stored could be the derivative of the intensity variation along the virtual scan line. Or, by maintaining a running time window of intensity information in the image acquisition block 1, the edge location operation could be performed in the image acquisition block 1, and the element widths could be stored in a memory instead of storing selected pixel data in virtual scan line buffers 103.

Other embodiments of the present invention may involve conveyer scanner systems. An embodiment of a high inertia conveyer system is described with reference to FIGS. 8A-8C. FIGS. 8A-8C show a perspective view, top plan view, and side elevation view, respectively, of a conveyor scanning system. The conveyor 301 comprises, among other things, a belt 302 upon which products bearing bar code labels are moved relative to a single line scanner 300. In conveyor scanning systems, constant belt velocity is desirable when using a single line scanner because product movement on the belt provides one of the two dimensions of a multi-dimensional scan. Velocity variations of the belt 302 will cause errors in the measurement of bar/space widths roughly proportional to the sine of the angle between the direction of belt movement and the bar/space edge. The high inertia conveyor 301 reduces variations in belt speed due to the large rotational moment of inertia (or large mass) of the belt 302 compared to the mass of the items being placed on or removed from the belt 302, and thus is less likely to be affected by sudden variations in belt drag caused by the placement or removal of items on the belt 302. Another means of reducing error due to changes in belt loading is by detecting and compensating for variations in belt speed. A belt speed detector could provide feedback to a controller that speeds up or slows down the belt as necessary to maintain a constant overall belt velocity.

Figures 9A, 9B:
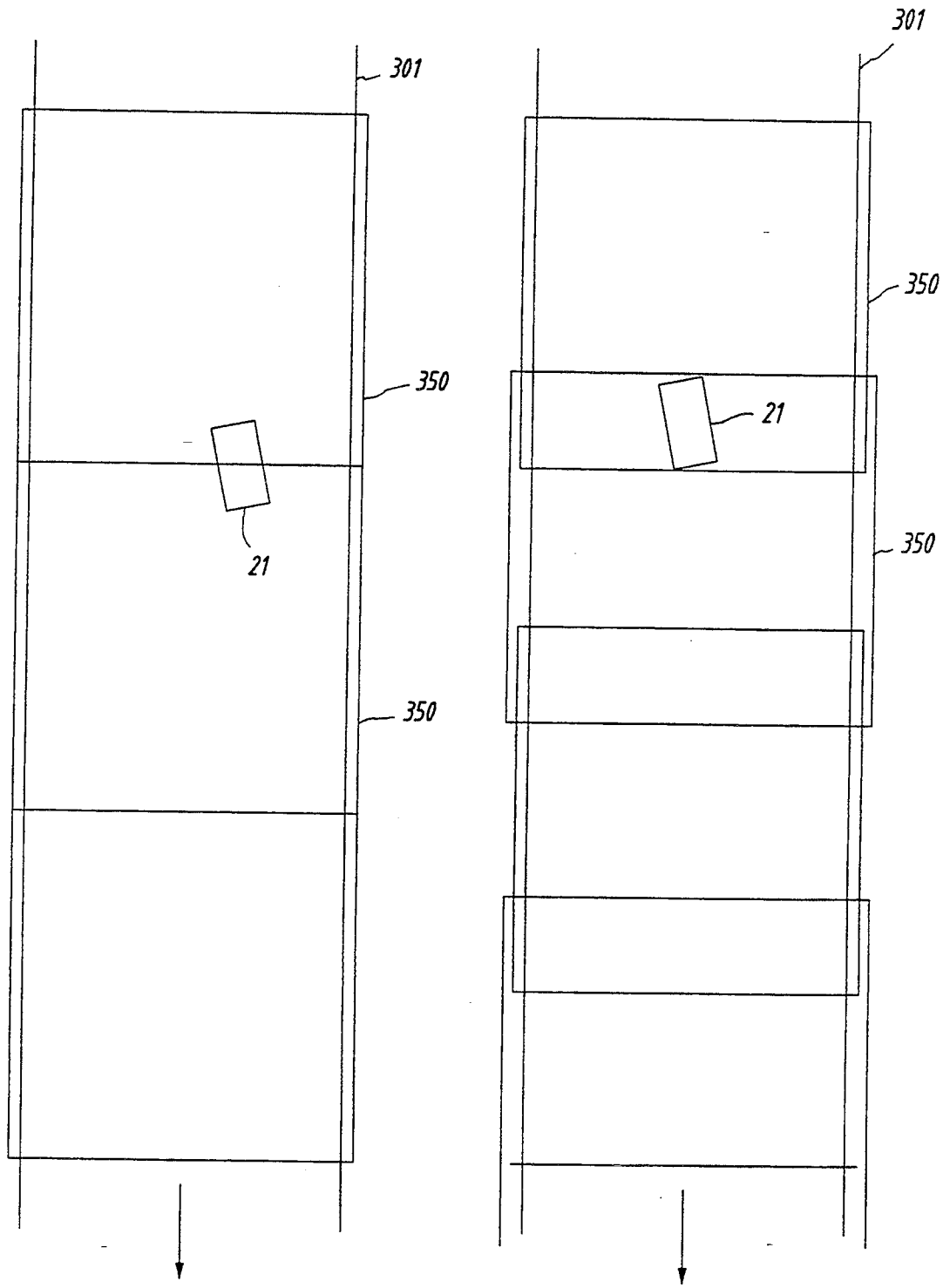
FIGS. 9A and 9B are top views of a conveyor showing coverage of single and overlapping area scanner schemes, respectively.

For applications where a bar code may be moving, such as where a product bearing a bar code is on a conveyor, it is advantageous to capture overlapping two-dimensional raster image areas to ensure capture of bar code data that may be only partially contained within any one two-dimensional raster image scan area. FIGS. 9A and 9B show top views of a conveyor covered by single and overlapping area scanner schemes, respectively. A minimum decodable piece 21 moves along a conveyor 301. As the conveyor 301 moves, a one-dimensional scanner repeatedly collects and stores linear data until information covering an area 350 is stored. The size of the scan area 350 depends in part upon the size of the memory and/or buffer available to store the information. The scan area 350 in essence represents a "snapshot" of a region of the conveyor 301. As shown in FIG. 9A, if scanning of a new scan area 350 begins only after scanning of the previous area 350 is completed, then a minimum decodable label piece 21 crossing over two scan areas 350 may not be fully read in either scan. In order to ensure capture of bar code data that may be only partially contained within any one scan area 350, it is advantageous to provide an overlapping scan pattern as shown in FIG. 9B. A new scan area 350 is begun far enough before the prior scan area 350 is completed so that a minimum decodable piece 21 will be completely contained in either scan area 350. The overlapping scans may, but need not, be accomplished with two scanners. Preferably, however, the overlapping scans are accomplished by a single scanner and multiple memory storage blocks. Data from the overlapping regions is directed to two separate memories or separate sections of a memory device, one for the present scan and a second for the new scan. Thus, construction of a new virtual raster scan is started partway through the first raster scan. Each memory is processed separately using the virtual scan line method described elsewhere herein in order to locate bar code information.

Figure 10A:
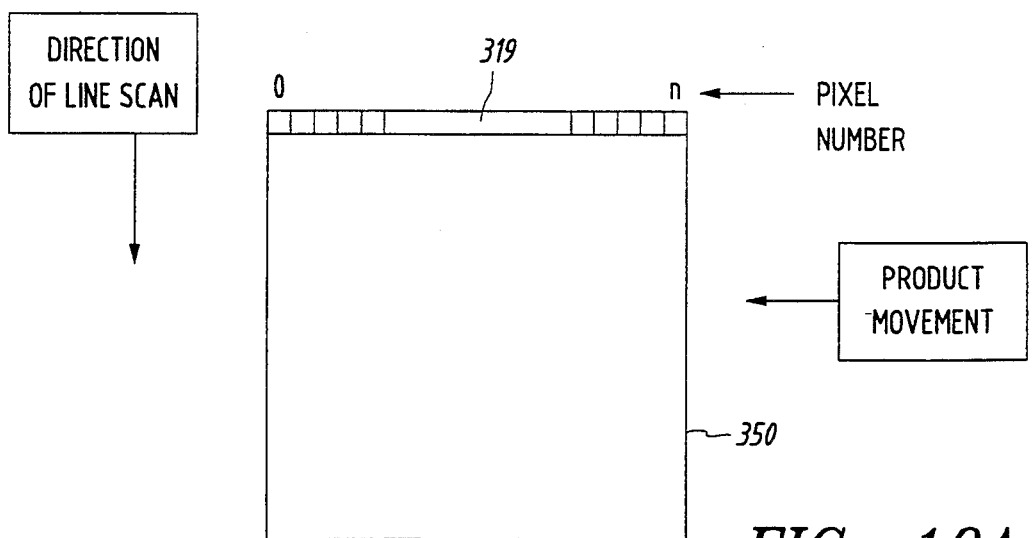
FIGS. 10A-10C are diagrams showing various orientations of a single-line scanner with respect to product movement in order to cover a two-dimensional region.
Figure 10B:
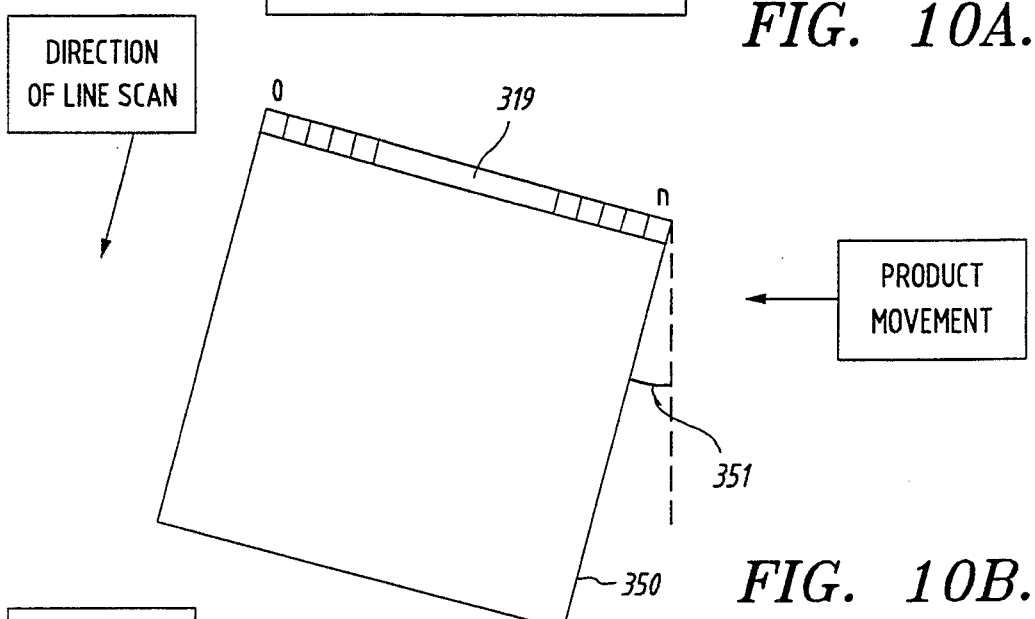

Other techniques related to scanners using motion to obtain one dimension of a raster input involve motion compensation and deblurring to adjust for distortion caused by product motion. FIG. 10A shows a scan area 350 obtained by sweeping a CCD line array 319 or other linear scanner perpendicular to the direction of product movement (e.g., perpendicular to the direction of the conveyor belt motion if on a conveyor). When a scan area is obtained in such a manner, distortion may occur along the diagonal axis leading to the possibility of misread information. The distortion results from the fact that the surface being scanned will be moving in relation to the raster locations. Thus, for example, the lines of a bar code that are not parallel to the scanning line may appear skewed in the raster image area. A possible way to eliminate the skew is shown in FIG. 10B. In FIG. 10B, the line scan mechanism 319 is rotated such that each pixel tracks the surface movement from line to line. The angle of rotation 351 is determined by the combination of product movement speed and the speed of the line scan that forms the scan area 350. A problem with this method, however, is that it may distort the angles of the virtual scan lines, requiring new rise and run values to correct the distortion. Another problem with this method is that there will still be blurring in two directions. Two-dimensional blurring is much more difficult to compensate for than one-dimensional blurring.

Figure 10C:
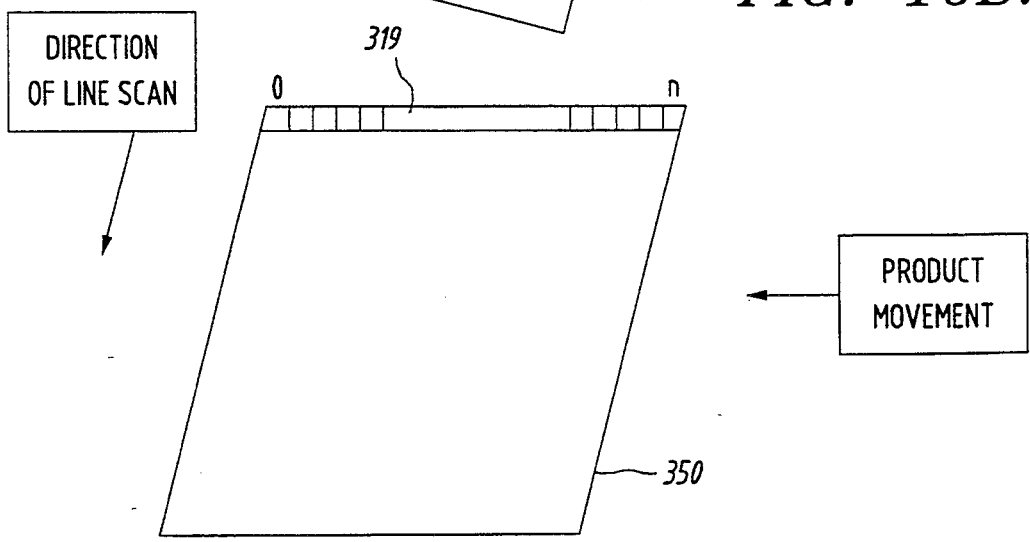
Figures 11A, 11B:
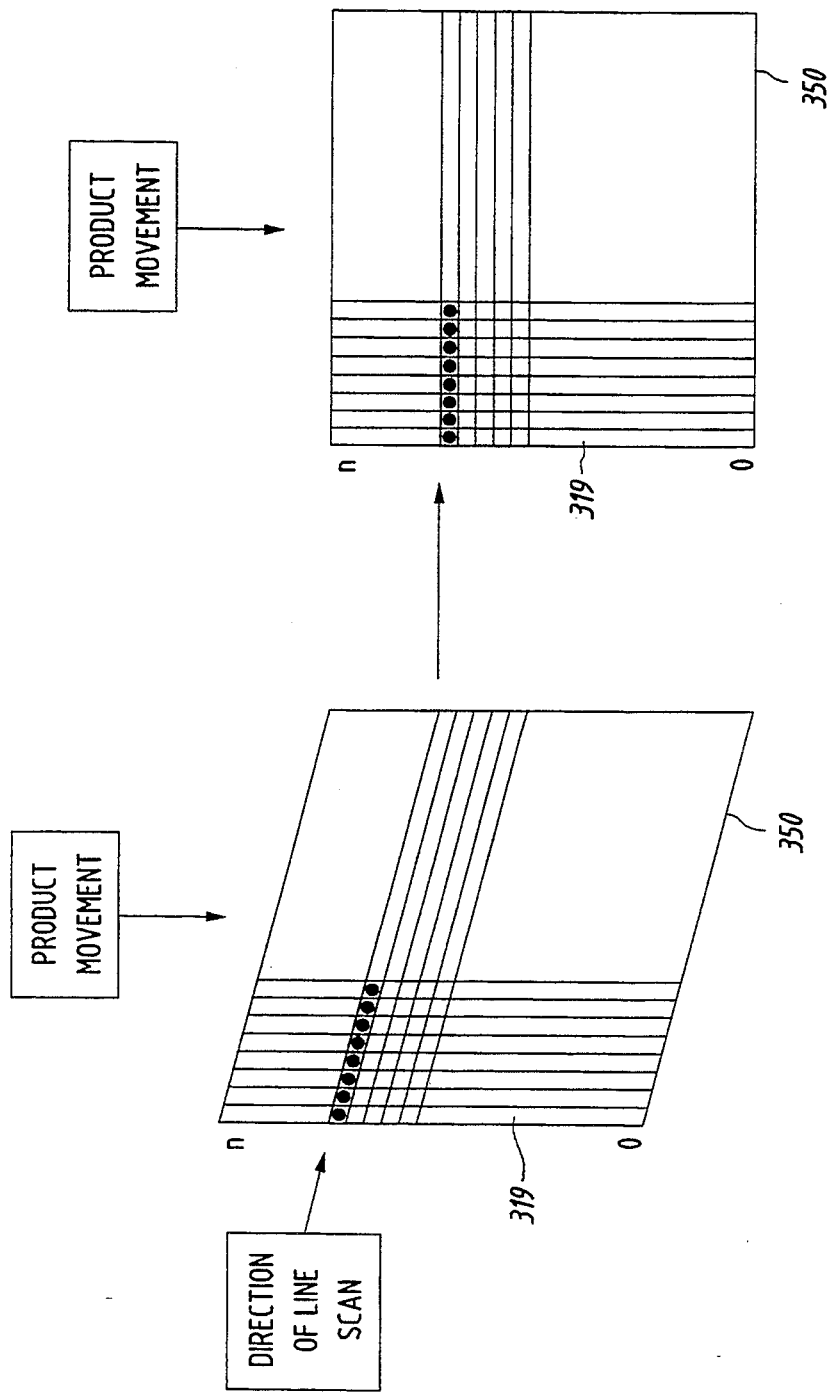
FIGS. 11A and 11B are diagrams showing how the preferred method of FIG. 10C results in properly oriented two-dimensional image suitable for virtual scan line processing.

Another method of motion compensation is shown in FIG. 10C. In the method of FIG. 10C, the CCD line array 319 or other linear scanner is kept parallel with the direction of product movement. However, the direction of the line scan is skewed to form the raster area. In this manner, an orthogonal area of the bar code data will be imaged in the raster area. FIGS. 11A and 11B show how the method of FIG. 10C results in properly oriented two-dimensional image suitable for virtual scan line processing. A problem may still occur, however, because of the way in which CCD arrays accumulate light to produce a corresponding voltage level. Each pixel integrates the light received while the line is moved to form the raster area. For bar code edges that are not parallel to the sensor motion, blurring will occur as the line is moved during the integration time. This problem may be reduced by use of an electronic shutter or a strobe light to shorten integration time.

Once the product motion has been compensated for, it is possible to apply conventional one-dimensional deblurring techniques to perform a second level of compensation for the motion of the linear sensor 319. The one-dimensional deblurring techniques may use knowledge of the speed of the linear sensor 319 to perform compensation. See generally, Jae S. Lim, "Two Dimensional Signal Processing" (Prentice-Hall 1990). However, if motion compensation for the product motion as described above were not carried out, much more difficult two-dimensional deblurring techniques would be required to compensate for not only the motion of the linear sensor 319 but also the motion of the bar code label.

Other embodiments of the present invention involve various mounting options of the scanner with respect to a checkstand or conveyor belt. The scanner may be mounted inside a cash register, keyboard housing, checkstand, or other commonly used point-of-sale equipment to decrease the system cost and reduce the space needed for equipment on the checkstand. Another mounting option is shown in FIGS. 12A–12C. FIGS. 12A–12C show a top plan view, side elevation view, and perspective view, respectively, of a bottom surface conveyor scanning system. A scanner 310 may be mounted under a conveyer belt 301 or looking up between a narrow gap 313 between the ends of two conveyer belts 311 and 312 or similar devices for moving items. It is also possible to mount the scanner offset from a position directly below the gap 313, looking at some angle to the vertical to avoid debris which may fall through the gap 313, and provide a view of the end of the object as well as the bottom surface. The gap 313 may be narrow because the scanner 310 may be a single line scanner that obtains two-dimensional raster input from the motion of products on the conveyor belt 301, therefore having the advantages of omnidirectional scanning described above with a minimum of product jostling from one belt 312 to another belt 311 due to the narrowness of the gap 313. It is also possible to mount the scanner 310 above a conveyer belt 301 or adjacent to a conveyer belt 301 at an angle permitting the scanning of approaching objects or, alternatively, at an angle permitting the scanning of departing objects.

If the bar code labels to be read are pre-oriented in a particular direction, it may be possible to obtain good performance with a relatively simple virtual scan line pattern. For example, in a system having a conveyor for aligning in an upright direction bottles or cans bearing bar code labels, the bar code edges could be expected to be oriented in either a horizontal or vertical direction, depending on the particular system. In such a case, a pattern of substantially vertical or horizontal virtual scan lines with no or few diagonal scan lines may be generated to read the pre-oriented labels without sacrificing system performance.

While the invention has been particularly shown and described with reference to certain embodiments, it will be understood by those skilled in the art that various changes in form and detail may be made without departing from the spirit and scope of the invention.

What is claimed is:

1. A method of reading encoded symbols comprising the steps of:
    generating a pattern of virtual scan lines traversing a two-dimensional imaging region, said pattern of virtual scan lines comprising less than the entirety of said two-dimensional imaging region, obtaining a stream of raster data over said two-dimensional imaging region,
    prior to storing any of said raster data, identifying a select portion of said raster data corresponding to said virtual scan lines,
    storing said select portion of raster data, and
    decoding said select portion of raster data.

2. A method as in claim 1 wherein the encoded symbol comprises a bar code label.

3. A method as in claim 1 wherein said raster data comprises light intensity data.

4. A method as in claim 1 further comprising the step of storing said select portion of raster data in an intermediate buffer prior to said step of storing said select portion of raster data in memory but after identifying said select portion of said raster data corresponding to said virtual scan lines.

5. A method as in claim 1 wherein said step of obtaining a stream of raster data is accomplished using a two-dimensional imaging array.

6. A method as in claim 5 wherein said two-dimensional imaging array comprises a CCD array.

7. A method as in claim 1 wherein the step of obtaining a stream of raster data further comprises the step of moving a single line scanner relative to said encoded symbol in order to obtain two dimensions of said raster data.

8. A method as in claim 7 wherein said step of moving a single line scanner relative to said encoded symbol is accomplished by use of a conveyor.

9. A method as in claim 7 wherein said single line scanner is selected from the group consisting of: a linear imaging array and a flying spot optical scanner.

10. A method as in claim 1 wherein said pattern of virtual scan lines is generated according to the dimensions of the encoded symbol to be read.

11. A method as in claim 1 wherein said step of storing said select portion of raster data further comprises the step of storing said select portion of raster data in an array of memory areas, wherein each of said memory areas is associated with a particular virtual scan line.

12. A method as in claim 1 wherein the step of decoding said select portion of raster data comprises interpolating said select portion of raster data to sub-pixel resolution.

13. A method as in claim 2 further comprising the step of counting the number of edges of said bar code label and not completing said step of decoding said select portion of raster data unless there are enough bars and spaces to form a minimum decodable label piece.

14. A method as in claim 2 wherein said step of generating a pattern of virtual scan lines further comprises the step of generating a plurality of families of parallel lines, each family separated by no more than a maximum angle from the next family.

15. A method as in claim 14 wherein said maximum angle is no larger than the angle defined by the equation 2 * Arctan (H/2W), wherein W is a maximum expected apparent width of a minimum decodable portion of said bar code label and H is a minimum expected apparent height of said bar code label.

16. A method as in claim 1 further comprising the step of optimizing the generation of said pattern of virtual scan lines by translating selected virtual scan lines slightly to eliminate or increase points in common with other virtual scan lines.

17. A method as in claim 1 further comprising the step of optimizing the generation of said pattern of virtual scan lines by replacing selected single virtual scan lines with two shorter virtual scan lines, the first of which originates from an end point of the original virtual scan line and terminates at a point slightly displaced from the original virtual scan line, and the second of which originates from the termination point of the first to the opposite endpoint of the original virtual scan line.

18. A method as in claim 1 wherein said step of obtaining a stream of raster data comprises scanning said raster data at a rate of approximately 10 Megahertz.

19. A method as in claim 14 further comprising the step of, for each virtual scan line family, dividing said imaging region into subregions having an identical virtual scan line pattern for the particular family, and selecting portions of raster data according to the pattern defined in the subregion.

20. A method as in claim 14 wherein each family of parallel lines is separated by the same angle from the next family.

21. A method as in claim 20 wherein said maximum angle divides integrally into 180 degrees.

22. A system for reading encoded symbols comprising:
    an optical sensor,
    a generator for generating a pattern of virtual scan lines traversing a two-dimensional imaging region,
    a selector receiving serial raster data from said optical sensor and outputting a selected portion of said raster data, the selected portion comprising only raster data falling on said virtual scan lines,
    a memory capable of storing said selected portion of raster data, and
    a processor for decoding said selected portion of raster data.

23. A system as in claim 22 wherein the encoded symbol comprises a bar code label.

24. A system as in claim 22 wherein said selected portion of raster data comprises light intensity data.

25. A system as in claim 22 further comprising an intermediate buffer connected between said selector and said memory.

26. A system as in claim 22 wherein said optical sensor comprises a two-dimensional imaging array.

27. A system as in claim 26 wherein said two-dimensional imaging array comprises a CCD array.

28. A system as in claim 22 wherein said optical sensor comprises a linear imaging array with a second dimension of said two-dimensional imaging region being provided by relative movement of said encoded symbol with respect to said optical sensor.

29. A system as in claim 28 further comprising a conveyor for providing said relative movement.

30. A system as in claim 22 wherein said optical sensor comprises a flying spot optical scanner with a second dimension of said two-dimensional imaging region being provided by relative movement of said encoded symbol with respect to said flying spot optical scanner.

31. A system as in claim 30 wherein said flying spot optical scanner comprises a laser scanner.

32. A system as in claim 22 wherein said pattern of virtual scan lines is determined according to dimensions of the encoded signal to be read.

33. A system as in claim 22 wherein said memory is comprised of an array of memory areas, each of said memory areas being associated with a particular virtual scan line.

34. A system as in claim 22 wherein said processor decodes said selected portion of raster data using sub pixel interpolation.

35. A system as in claim 34 further comprising a filter having an impulse response of substantially (sin x)/x.

36. A system as in claim 23 wherein said bar code label comprises bars and spaces, and said processor counts the number of transitions between bars and spaces in a particular virtual scan line and stops decoding for said virtual scan line unless there are enough bars and spaces to form a minimum decodable label piece.

37. A system as in claim 22 wherein said pattern of virtual scan lines comprises a plurality of families of parallel lines, each family separated by no more than a maximum angle from the next family.

38. A system as in claim 37 wherein said encoded symbol is a bar code label, and said maximum angle is no larger than the angle defined by the equation 2 * Arctan (H/2W), wherein W is a maximum expected apparent width of a minimum decodable portion of said bar code label and H is a minimum expected apparent height of said bar code label.

39. A system as in claim 22 wherein said raster data is scanned at a rate of approximately 10 Megahertz.

40. A system as in claim 37 wherein the selection of said raster data for storage into memory is carried out by dividing said imaging region for each scan line family into identical rectangular tiles having the same pattern for a given scan line family, and raster data is selected according to said pattern in said tile.

41. A system as in claim 40 wherein said pattern in said tile traverses a diagonal of said tile.

42. A system as in claim 40 wherein said tiles are further divided into subtiles either having a virtual scan line pattern identical to other subtiles for the family or having no virtual scan line pattern for the family, and raster data is selected according to said pattern in said subtiles.

43. A system as in claim 22 wherein the data stored in said memory comprises a derivative of an intensity variation along a given virtual scan line.

44. A system as in claim 22 wherein at least part of said optical sensor and said virtual scan line generator are located on the same integrated circuit device.

45. A system as in claim 22 further comprising means for detecting edges of elements of said encoded symbol.

46. A system as in claim 22 further comprising a microprocessor or microcontroller.

47. A system as in claim 22 further comprising point-of-sale equipment housing said optical sensor.

48. A system as in claim 22 wherein said processor uses knowledge of the virtual scan line boundaries to expedite decoding.

49. A system as in claim 22 further comprising a handheld scanner.

50. A system as in claim 22 further comprising a presentation mode scanner.

51. A system as in claim 22 further comprising a sweep mode reader.

52. A system as in claim 37 wherein each family of parallel lines is separated by the same angle from the next family.

53. A system as in claim 52 wherein said maximum angle divides integrally into 180 degrees.

54. A system as in claim 22 wherein said selected portion of raster data falling on said virtual scan lines consists of all of the raster data falling on said virtual scan lines.

55. A system for reading encoded symbols comprising:
an optical sensor,
a set of virtual scan lines mapped onto a two-dimensional imaging region,
pixel selection logic coupled to said optical sensor for receiving sequential pixel data over said imaging region and identifying from said pixel data select pixels falling on at least one of said virtual scan lines,
a memory for storing from said sequential pixel data only said select pixels, and
a processor for processing said stored pixels.

56. A system as in claim 55 wherein one or more of said virtual scan lines comprise a sequence of adjacent pixels.

57. A system as in claim 55 wherein said memory comprises a series of memory areas and each of said memory areas is associated with a particular virtual scan line.

58. A system as in claim 55 wherein said optical sensor and said pixel selection logic are combined in a single integrated circuit.

59. A system as in claim 55 wherein said pixel selection logic further comprises means for dividing said imaging region into subregions, each of which has an identical and simpler pattern of virtual scan lines.

60. A method of scanning encoded symbols in two dimensions comprising the steps of:
moving an encoded symbol across a field of view of a line scanner,
selecting a pattern of virtual scan lines covering a two-dimensional imaging region defined by the width of a field of view of said line scanner and a distance covered by the motion of said encoded symbol, and
scanning said encoded symbol periodically as it crosses said field of view while storing only scanning data corresponding to one or more of said virtual scan lines.

61. A method as in claim 60 wherein said step of moving the encoded symbol comprises moving the encoded symbol with a high inertia conveyor system.

62. A method as in claim 60 wherein said step of moving the encoded symbol comprises moving the encoded symbol on at least two adjacent conveyor belts having a relatively narrow gap between them, and said line scanner is located so that it scans through said gap.

63. A method as in claim 60 further comprising the step of incorporating said line scanner into point-of-sale equipment.

64. A method as in claim 63 wherein said point-of-sale equipment is selected from the group consisting of: a cash register, a keyboard cabinet, and a check stand.

65. A method as in claim 60 further comprising the step of decoding said scanning data.

66. A method as in claim 60 further comprising the step of obtaining overlapping area scans by starting a new area scan before completion of the previous area scan.

67. A method of reading an image comprising the steps of:
generating a pattern of virtual scan lines traversing a multi-dimensional imaging region,
scanning an area to obtain data over said imaging region while storing only data from selected points lying on said virtual scan lines, and
interpreting at least a portion of said stored data to determine a dimensional characteristic of an image projected onto said multi-dimensional imaging region.

68. A method as in claim 67 wherein said step of scanning an area to obtain data further comprises the step of obtaining raster data.

69. A method as in claim 67 wherein said multi-dimensional imaging region is a two-dimensional imaging region.

70. A method as in claim 67 wherein said step of interpreting at least a portion of said stored data further comprises the step of decoding said stored data.

71. A method as in claim 67 wherein, for a projected image of a predefined apparent minimum height and width, at least one of said virtual scan lines traverses an entire dimension of the projected image no matter at what angle of orientation the projected image lies with respect to said multi-dimensional imaging region.

72. A method of reading images comprising:
generating a pattern of virtual scan lines over a multi-dimensional imaging region by selecting a family of substantially parallel virtual scan lines separated by a predefined distance and repeatedly rotating said family by a predefined angle,
detecting light incident on said imaging region and generating a stream of sequential pixel data thereby,
identifying and storing from said data stream only pixel data corresponding to selected points lying on said virtual scan lines, and
determining from said stored pixel data a dimensional characteristic of an image projected onto said imaging region.

* * * * *

UNITED STATES PATENT AND TRADEMARK OFFICE
CERTIFICATE OF CORRECTION

PATENT NO. : 5,446,271  
DATED : August 29, 1995  
INVENTOR(S) : Craig D. Cherry et al.

Page 1 of 2

It is certified that error appears in the above-indentified patent and that said Letters Patent is hereby corrected as shown below:

Column 6, line 17, after the comma and before "mini-" insert --"--.

Column 8, line 61, change "$N_N$" to --$N_H$--.

Column 9, line 60, after "step" replace ",," with --,--.

Column 11, line 14, after "lines" delete ";".

Column 13, line 27, after "the" and before "particular" delete ";".

Column 19, line 59, change ""poi h"" to --"poi.h",--.

Column 19, line 60, change ""fifo h"" to --"fifo.h",--.

Column 19, line 60, change "video h" to --video.h--.

Column 19, line 60, change "pcvision h" to --pcvision.h--.

Column 21, line 1, after "samples", delete ";".

UNITED STATES PATENT AND TRADEMARK OFFICE
CERTIFICATE OF CORRECTION

PATENT NO. : 5,446,271
DATED : August 29, 1995
INVENTOR(S) : Craig D. Cherry et al.

It is certified that error appears in the above-indentified patent and that said Letters Patent is hereby corrected as shown below:

Column 21, line 52, change "art" to --an--.

Signed and Sealed this

Fourteenth Day of May, 1996

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,446,271
DATED : August 29, 1995
INVENTOR(S) : Craig D. CHERRY, et al.

It is certified that error appears in the above-indentified patent and that said Letters Patent is hereby corrected as shown below:

On the title page, in the illustrative figures, change reference label "13'" to --13--, and change reference label "L" to --L'--.

In Fig. 2C, add a reference label --F-- to the immediate left of the bracket on the right side of the figure.

In Fig. 4A, change reference label "13'" to --13--.

In Fig. 4A, change reference label "L" to --L'--.

In Fig. 4B, change reference label "13'" to --13--.

Signed and Sealed this

Fifteenth Day of July, 1997

Attest:

BRUCE LEHMAN

*Attesting Officer*      *Commissioner of Patents and Trademarks*